(12) United States Patent
Scurto et al.

(10) Patent No.: US 11,279,867 B2
(45) Date of Patent: Mar. 22, 2022

(54) ENZYMATIC COMPOSITIONS FOR THE DEGRADATION OF POLYMERS

(71) Applicant: UNIVERSITY OF KANSAS, Lawrence, KS (US)

(72) Inventors: Aaron M. Scurto, Oskaloosa, KS (US); William Gilbert, Lawrence, KS (US); Jenn-Tai Liang, College Station, TX (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 16/327,661

(22) PCT Filed: Aug. 23, 2017

(86) PCT No.: PCT/US2017/048204
§ 371 (c)(1),
(2) Date: Feb. 22, 2019

(87) PCT Pub. No.: WO2018/039340
PCT Pub. Date: Mar. 1, 2018

(65) Prior Publication Data
US 2020/0102491 A1    Apr. 2, 2020

Related U.S. Application Data

(60) Provisional application No. 62/378,482, filed on Aug. 23, 2016.

(51) Int. Cl.
E21B 43/16    (2006.01)
C09K 8/70    (2006.01)
(Continued)

(52) U.S. Cl.
CPC .............. *C09K 8/706* (2013.01); *C09K 8/524* (2013.01); *C09K 8/685* (2013.01); *C09K 8/805* (2013.01);
(Continued)

(58) Field of Classification Search
CPC ........ C09K 8/706; C09K 8/524; C09K 8/805; C09K 2208/24; C09K 2208/28
See application file for complete search history.

(56) References Cited

U.S. PATENT DOCUMENTS 4,251,631 A * 2/1981 Simon .................... C12N 11/08
435/106
5,018,577 A    5/1991 Pardue et al.
(Continued)

FOREIGN PATENT DOCUMENTS

AU    2012/203468 A1    7/2012

OTHER PUBLICATIONS

International Preliminary Report on Patentabilty issued for Application No. PCT/US2017/048204, dated Mar. 7, 2019.
(Continued)

*Primary Examiner* — Silvana C Runyan
(74) *Attorney, Agent, or Firm* — Meunier Carlin & Curfman LLC

(57) ABSTRACT

Provided herein are compositions and methods for degrading polymer systems. These compositions and methods can be used to effectively degrade a range of polymers commonly used in oil and gas operations, including polymers with carbon-carbon backbones such as polyacrylamides. Further, these compositions and methods can simultaneously degrade other organic molecules and pollutants associated with oil and gas operations. The compositions and methods described herein employ reactants that are more environmentally-friendly than conventional methods and
(Continued)

components used in, for example, polymer breaking processes.

21 Claims, 14 Drawing Sheets

(51) Int. Cl.
 *C09K 8/524* (2006.01)
 *C09K 8/68* (2006.01)
 *C09K 8/80* (2006.01)
(52) U.S. Cl.
 CPC .......... *E21B 43/16* (2013.01); *C09K 2208/24* (2013.01); *C09K 2208/28* (2013.01)

(56) References Cited

U.S. PATENT DOCUMENTS

| | | | |
|---|---|---|---|
| 7,473,672 B2* | 1/2009 | Kotlar | C09K 8/536 |
| | | | 507/219 |
| 2005/0130845 A1 | 6/2005 | Freeman et al. | |
| 2008/0135245 A1 | 6/2008 | Smith et al. | |
| 2009/0038797 A1* | 2/2009 | Skala | C04B 35/62823 |
| | | | 166/280.1 |
| 2009/0137429 A1 | 5/2009 | Rimassa et al. | |
| 2014/0295523 A1 | 10/2014 | Steer et al. | |
| 2016/0114325 A1* | 4/2016 | Tang | C07F 7/081 |
| | | | 435/32 |

OTHER PUBLICATIONS

International Search Report and Written Opinion. Application No. PCT/US2017/048204 dated Nov. 20, 2017. 12 pages.
Global Drilling & Chemicals Ltd. "GLO Drill POL LQ 1000." Global Drilling & Chemicals LTD. Oct. 28, 2013.
American Association of Cereal Chemists. "Starches." Chapter 1: Starch Structure. 1999. pp. 1-11.
Trevan, M.D. Enzyme Immobilization by Covalent Bonding. In, Walker, J.M. (eds) New Protein Techniques. Methods in Molecular Biology. vol 3. Human Press. 1988.

* cited by examiner

ENZYMATIC COMPOSITIONS FOR THE DEGRADATION OF POLYMERS

CROSS-REFERENCE TO RELATED APPLICATIONS

This application is a national stage application filed under 35 U.S.C. § 371 of PCT/US2017/048204 filed Aug. 23, 2017, which benefit of U.S. Provisional Application No. 62/378,482, filed Aug. 23, 2016, which is hereby incorporated herein by reference in its entirety.

BACKGROUND

Aqueous-based well treatment fluids are commonly used in drilling, stimulation, completion, and workover operations of subterranean formations. Treatment designs typically mandate such fluids to exhibit a certain level of viscosity. Polymers, such as polyacrylamides, are often used in such fluids to provide the requisite viscosity. For instance, polyacrylamides are often used to form viscous gels to prevent fluid loss into the formation. In drilling fluids, such polymers serve to suspend solids and assist in floating debris out of the wellbore.

A common stimulation operation is hydraulic fracturing, in which fractures are created which extend from the wellbore into the formation. In this method, a viscous fracturing fluid containing proppant is introduced into the produced fracture under high pressure. The proppant remains in the produced fracture to prevent the complete closure of the fracture, thereby forming a conductive channel extending from the wellbore into the treated formation that provides a highly conductive pathway for hydrocarbons and/or other formation fluids to flow into the wellbore. In addition to increasing the capability of proppant transport into the fracture during the fracturing operation, viscosity-modifying polymers also reduce friction, control fluid loss and control fracture geometry.

Unfortunately, filtrate from the fracturing fluid ultimately "leaks off" into the surrounding formation leaving a filter cake comprised of fluid additives including polymers. In order to restore the permeability of the formation near the wellbore, this filter cake must be removed, for example by degrading and/or fragmenting the additives forming the filter cake.

Breakers work by reducing the molecular weight of the viscosity-modifying polymer. Common breakers for use in fracturing fluids include chemical oxidizers. Unfortunately, existing chemical oxidizers suffer significant shortcomings. For example, at low temperatures, such as below 120° F., chemical oxidizers are generally too slow to be effective. At higher temperatures, chemical oxidizers react rapidly and, when they are encapsulated, are released prematurely, potentially leading to catastrophic loss of proppant transport. Since the use of chemical breakers in fracturing fluids at elevated temperatures typically compromise proppant transport and desired fracture conductivity, alternative sources for breakers are needed.

Recently, interest has focused on "slickwater" fracturing in the stimulation of low permeability or tight gas reservoirs. In slickwater fracturing, a well is stimulated by pumping water at high rates into the wellbore, thereby creating a fracture in the productive formation. Slickwater fluids are basically fresh water or brine having sufficient friction reducing agent(s) to minimize tubular friction pressures. Slickwater fracturing fluids usually have viscosities only slightly higher than unadulterated fresh water or brine. The characteristic low viscosity of such fluids facilitates reduced fracture height growth in the reservoir during stimulation. Polymers, such as polyacrylamides, are often used as friction reducing agents in slickwater fracturing. The friction reduction agent, if left in the formation, can cause formation damage. Effective means of degrading friction reduction agents in slickwater fracturing fluids is desired in order to minimize damage to the treated formation.

Lately, "hybrid" fracturing techniques have evolved wherein a conventional gelled and/or crosslinked fracturing fluid is used as a pad fluid which precedes the introduction of a proppant laden slickwater slurry. The relatively high viscosity gelled fluid provides increased fracture width and improved fluid efficiency, thereby mitigating the limitations of slickwater. Unfortunately, however, viscosity-modifying polymers (such as cross-linked polyacrylamides) used in such viscosified fluids form filter cakes on fracture faces which cause conductivity damage. Since the concentration of proppant in fracturing fluids free of viscosity-modifying polymer is low and results in propped fracture widths typically no greater than one layer of proppant (±0.5 mm), any effective fracture width lost to the deposition of a filter cake often has catastrophic consequences on fracture conductivity.

To address these shortcomings, there is a need for improved methods for degrading polymers, including polyacrylamides, used in oilfield applications.

SUMMARY

Residual polymers can present difficulties in a variety of fields, including in various oil and gas operations. Some polymers, especially polymers with carbon-carbon backbones, are particularly recalcitrant to traditional remediation techniques. In addition, many existing remediation methods employ breakers (e.g., chemical oxidants) that are ineffective and/or are not environmentally friendly.

To address these and other needs, provided herein are improved compositions and methods for degrading polymer systems. These compositions and methods can be used to effectively degrade a range of polymers commonly used in oil and gas operations, including polymers with carbon-carbon backbones such as polyacrylamides. Further, these compositions and methods can simultaneously degrade other organic molecules and pollutants associated with oil and gas operations. Finally, these compositions and methods employ reactants that are more environmentally-friendly than conventional methods and components used in, for example, polymer breaking processes.

In some examples, the methods described herein can employ a peroxidase enzyme and a peroxide to degrade a polymer (e.g., as part of an oil and gas operation and/or as part of a remediation operation). For example, provided herein are methods for degrading a polymer within a subterranean formation. The methods can comprise (a) providing a subterranean formation containing a polymer there within and a wellbore in fluid communication with the subterranean formation; (b) injecting a first composition comprising a peroxidase enzyme dissolved or dispersed in an aqueous carrier through the wellbore into the subterranean formation; and (c) injecting a peroxide through the wellbore into the subterranean formation.

Also provided are methods of treating a subterranean formation that comprise (a) injecting a fluid comprising a viscosity-modifying polymer into the subterranean formation; and (b) breaking the viscosity of the fluid by fragmenting the viscosity-modifying polymer, wherein the viscosity-modifying polymer is fragmented by injecting a peroxidase enzyme and a peroxide into the subterranean formation.

Also provided are methods of slickwater fracturing a subterranean formation that comprise (a) injecting a fracturing fluid comprising a polyacrylamide friction reducing agent into the subterranean formation at a pressure sufficient to create or enlarge a fracture in the subterranean formation; and (b) breaking the viscosity of the fluid by fragmenting the polyacrylamide, wherein the polyacrylamide is fragmented by injecting a peroxidase enzyme and a peroxide into the subterranean formation.

Also provided are methods of removing a polyacrylamide-containing filter cake in a well formed during drilling or completion of the well. These methods can comprise pumping into the well a peroxidase enzyme and a peroxide, thereby fragmenting the polyacrylamide that forms the filter cake.

Also provided herein are methods for degrading polymers within fluid handling systems associated with oil and gas operations. For example, the methods described herein can be used to degrade and/or remove accumulated polymer deposited within above-ground fluid handling systems associated with oil and gas operations, including fluid lines, filters, separator tanks, settling tanks, and storage tanks. Methods for degrading polymers within fluid handling systems can comprise contacting the components of the fluid handling system with a peroxidase enzyme and a peroxide (e.g., a composition comprising a peroxidase enzyme and a peroxide), thereby fragmenting the polymer. In some embodiments, this can comprise flowing a peroxidase enzyme and a peroxide (e.g., a composition comprising a peroxidase enzyme and a peroxide) through the components of the fluid handling system. In some embodiments, methods can further comprise washing or flushing the components of the fluid handling system with a fluid (e.g., water) to remove the degraded polymer.

In some examples, the methods described herein can employ a polymer-degrading enzyme immobilized on proppant particles. The proppant particles can facilitate transport and localization of the polymer-degrading enzyme within a subterranean formation at regions of potential formation damage. Accordingly, also provide are methods for degrading a polymer within a subterranean formation that comprise (a) providing a subterranean formation containing a polymer there within and a wellbore in fluid communication with the subterranean formation; and (b) injecting an enzyme breaker composition through the wellbore into the subterranean formation to degrade the polymer, wherein the enzyme breaker composition comprises proppant particles dispersed in an aqueous carrier, and a polymer-degrading enzyme immobilized on proppant particles.

Also provided are compositions that comprise a viscosity-modifying polymer and a population of proppant particles dispersed in an aqueous carrier, wherein the proppant particles further comprise a polymer-degrading enzyme immobilized on proppant particles. In some embodiments, the polymer-degrading enzyme can be covalently bound to the surface of the proppant particles. The composition can comprise from greater than 0% to 5% by weight proppant particles and from greater than 0% to 10% by weight viscosity-modifying polymer, based on the total weight of the composition.

The polymer-degrading enzyme can be any suitable enzyme or enzymes that participates in a reaction that degrades or fragments with viscosity-modifying polymer. For example, the polymer-degrading enzyme can be (depending on the nature of the viscosity-modifying polymer) a peroxidase, a cellulase, a hemicellulose, an asparaginase, a hydrolase, a xanthanase, an amylase, a pectinase, a glucosidase, a xylanase, a galactomannase, a galactosidase, a mannosidase, a glucanase, or a combination thereof. The viscosity modifying polymer can be any polymer used in an oil and gas operation. In certain embodiments, the viscosity-modifying polymer can comprise a polyacrylamide.

The methods described herein can also be employed to control delivery of an active agent to a subterranean formation. For example, provided herein are methods of releasing an active agent into a subterranean formation that comprise (a) providing a subterranean formation containing a wellbore in fluid communication with the subterranean formation; (b) injecting an active agent encapsulated in a polymeric particle through the wellbore into the subterranean formation; and (c) injecting a peroxidase enzyme dissolved or dispersed in an aqueous carrier and a peroxide through the wellbore into the subterranean formation, wherein the polymeric particle is fragmented by the peroxidase enzyme and the peroxide thereby releasing the active agent into the subterranean formation.

DETAILED DESCRIPTION

Figure 1:
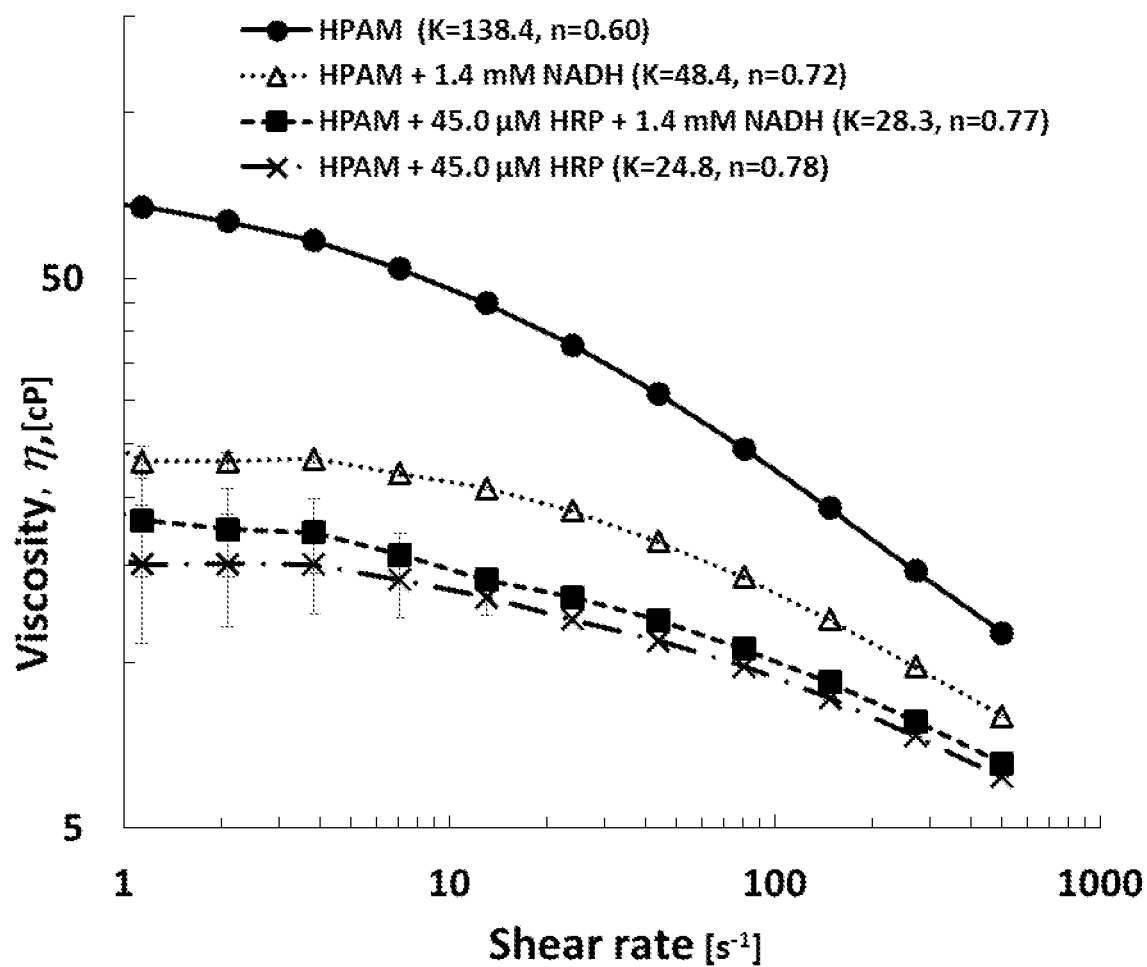
FIG. 1 is a plot illustrating the viscosity of 1980 ppm HPAM and the viscosity reduction observed from component addition. Initial viscosity was measured at 25° C. before incubation; lines are smoothed data (n=3).

As discussed above, residual polymers can present difficulties in a variety of fields, including in various oil and gas operations. Some polymers, especially polymers with carbon-carbon backbones, are particularly recalcitrant to traditional remediation techniques. In addition, many existing remediation methods employ breakers (e.g., chemical oxidants) that are ineffective and/or are not environmentally friendly.

Provided herein are improved compositions and methods for degrading polymer systems. These compositions and methods can be used to effectively degrade a range of polymers commonly used in oil and gas operations, including polymers with carbon-carbon backbones such as polyacrylamides. Further, these compositions and methods can simultaneously degrade other organic molecules and pollutants associated with oil and gas operations. Finally, these compositions and methods employ reactants that are more environmentally-friendly than conventional methods and components used in, for example, polymer breaking processes.

In some examples, the methods described herein can employ a peroxidase enzyme and a peroxide to degrade a polymer (e.g., as part of an oil and gas operation and/or as part of a remediation operation). For example, provided herein are methods for degrading a polymer within a subterranean formation. The methods can comprise (a) providing a subterranean formation containing a polymer there within and a wellbore in fluid communication with the subterranean formation; (b) injecting a first composition comprising a peroxidase enzyme dissolved or dispersed in an aqueous carrier through the wellbore into the subterranean formation; and (c) injecting a peroxide through the wellbore into the subterranean formation.

The first composition can be injected during the course of an oil and gas operation, such as a hydraulic fracturing operation (e.g., a slickwater fracturing operation). In some embodiments, step (b) and step (c) are performed sequentially. For example, in some embodiments, the first composition comprising the peroxidase enzyme can be injected first to position the enzyme within the subterranean formation, and the peroxide can be injected subsequently to begin degradation of the polymer. In other embodiments, step (b) and step (c) can be performed simultaneously. For example, the peroxide can be present in the first composition, and the peroxidase enzyme and peroxide can be injected into the subterranean formation at the same time.

The peroxidase enzyme can be any suitable peroxidase enzyme, such as a heme peroxidasae or a non-heme peroxidase. Examples of suitable peroxidases include catalase, Dyp-type peroxidase, Di-Heme cyctochrome c peroxidase (DiHCcP), haloperoxidase, non-animal peroxidases (e.g., class I peroxidases such as ascorbate peroxidase, catalase peroxidase, cyctochrome c peroxidase, hybrid ascorbate cyctochrome c peroxidase; class II peroxidases such as lignin peroxidase, manganese peroxidase, and versatile peroxidase; class III peroxidases, such as horseradish peroxidase and soybean peroxidase; and other non-animal peroxidases), animal peroxidases (e.g., prostaglandin H synthase/cyclooxygenase, linoleate diol synthase (PGHS-like), alpha dioxygenase, dual oxidase, peroxidasins, peroxinectins, non-mammalian vertebrate peroxidase, thyroid peroxidase, myelo-peroxidase (MPO), lacto-peroxidase, and eosinophil peroxidase), manganese catalase, NADH peroxidase, thiol peroxidases (e.g., glutathione peroxidase and peroxiredoxins, such as 1-cysteine peroxiredoxin, 2-cysteine peroxiredoxin, 2-cysteine peroxiredoxin, and 2-cysteine peroxiredoxin), haloperoxidases (e.g., no heme, no metal haloperoxidase and no heme, vanadium haloperoxidase), and alkylhydroperoxidase D-like peroxidases (e.g., alkylhydroperoxidase D, carboxymuconolactone decarboxylase, hydrolase-CMD fusion, and double CMD). Other examples of peroxidases include chloride peroxidase, vanadium bromoperoxidase, hemoproteins (hemoglobin, myoglobin), and peroxidase class EC 1.11.1.x. In some embodiments, the peroxidase enzyme can be chosen from horseradish peroxidase, soybean peroxidase, and combinations thereof.

In some cases, the peroxidase enzyme can be dissolved in the aqueous carrier. In other cases, the peroxidase enzyme can be encapsulated within carrier particles (e.g., nanoparticles, microparticles, or liposomes) to sequester the peroxidase enzyme and/or delay release of the peroxidase enzyme during injection.

In certain embodiments, the first composition can further comprise proppant particles. Proppant particles are used conventionally to "prop" or hold open fractures during fracturing operations once the pumping pressure has been released. Proppant size and type can be selected for the ability to maintain a highly conductive, productive channel for oil and gas production under the specific well conditions and pressure. Examples of suitable proppant particles include silica sand, resin-coated silica sand, ceramic, and combinations thereof.

In some embodiments, the peroxidase enzyme can be immobilized on the proppant particles. For example, the peroxidase can be disposed in a coating present on the surface of the proppant particles. Alternatively, the peroxidase can be disposed within the proppant particles themselves. For example, in some cases, a biomaterial containing a peroxidase enzyme (e.g., soybean hulls containing soybean peroxidase) can be formed into or combined with a proppant particle. In certain embodiments, the peroxidase enzyme can be covalently bound to the surface of the proppant particles (e.g., by means of a bifunctional linker).

The peroxide can be any suitable peroxide (e.g., any compound or molecule that includes a peroxide moiety). For example, in some embodiments, the peroxide can be an organic peroxide, such as benzoyl peroxide or methyl ethyl ketone peroxide. In other embodiments, the peroxide can be an inorganic peroxide, such as a persulfate (e.g., potassium persulfate, ammonium persulfate, sodium persulfate, potassium peroxymonosulfate, or sodium peroxymonosulfate). In certain embodiments, the peroxide can comprise hydrogen peroxide. The peroxide can also be a compound, molecule, or combination thereof that itself does not include a peroxide moiety, but which reacts or is modified at some point during or after injection to generate a compound or molecule that includes a peroxide moiety.

The polymer can be any polymer used in an oil and gas operation. For example, the polymer can comprise a polysaccharide, such as a galactomannan polymer (e.g. guar gum), a derivatized galactomannan polymer, starch, xanthan gum, a derivatized cellulose (e.g. hydroxycellulose or hydroxyalkyl cellulose); a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some cases, the polymer can be a water-soluble polymer. In certain cases, the polymer can comprise a biopolymer, such as a polysaccharide. For example, the polysaccharide can be chosen from cellulose, galactomannan, derivatives thereof, and combinations thereof. Other examples include xanthan, starch, derivatives thereof, and combinations thereof. In some examples, the polysaccharide can comprise guar gum or a derivative thereof. Examples of guar derivatives include hydroxypropyl guar (HPG), carboxymethyl guar (CMG), and carboxymethyl hydroxypropyl guar (CMHPG). In some examples, the polysaccharide can comprise cellulose or a derivative thereof. Examples of cellulose derivatives include hydroxyethyl cellulose (HEC), hydroxypropyl cellulose, and carboxymethyl hydroxyethyl cellulose (CMHEC).

In certain embodiments, the polymer can comprise a carbon-carbon backbone. For example, the polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (e.g., styrene), acid-containing monomers (e.g., monomers comprising —COOH groups, such as acrylic acid or methacrylic acid; and monomers comprising sulfonic acid groups, such as vinylsulfonic acid, allylsulfonic acid, or 2-acrylamido-2-methylpropanesulfonic acid), and (meth)acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In other embodiments, the polymer can comprise a polyether. Examples of polyethers include poly(ethylene oxide) (also referred to as polyethylene glycol (PEG)), poly(propylene oxide) (also referred to as polypropylene glycol (PPG)), polytetramethylene glycol (PTMG), copolymers thereof, and combinations thereof.

In certain embodiments, the polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

In some embodiments, the polymer can be deposited on a surface within the subterranean formation. For example, the polymer can comprise a filter cake formed on a surface within the subterranean formation from a drilling fluid, a drill-in fluid, or a fracturing fluid. In certain embodiments, the polymer can comprise a polyacrylamide-containing filter cake in a well formed during drilling or completion of the well.

When the peroxidase enzyme and peroxide are combined, hydroxyl free radicals are generated though the breakdown of the peroxide. These free radicals can react with the polymer present in the subterranean reservoir, efficiently fragmenting/degrading even recalcitrant polymers such as polyacrylamides. The free radicals can also react with other target chemicals (e.g., organic compounds or other pollutants present in a fracturing fluid, such as biocides, anti-scaling agents, etc.), potentially reducing the need for large-scale flowback water treatment.

Also provided are methods of treating a subterranean formation that comprise (a) injecting a fluid comprising a viscosity-modifying polymer into the subterranean formation; and (b) breaking the viscosity of the fluid by fragmenting the viscosity-modifying polymer, wherein the viscosity-modifying polymer is fragmented by injecting a peroxidase enzyme and a peroxide into the subterranean formation.

In some embodiments, the peroxidase enzyme and the peroxide can be injected sequentially. For example, in some embodiments, the peroxidase enzyme can be injected first to position the enzyme within the subterranean formation, and the peroxide can be injected subsequently to begin fragmentation of the viscosity-modifying polymer. In other embodiments, the peroxidase enzyme and the peroxide can be injected simultaneously. For example, the peroxidase enzyme and peroxide can be injected into the subterranean formation at the same time as components of a single composition.

The peroxidase enzyme can be any of the suitable peroxidase enzymes discussed above. In certain embodiments, the peroxidase enzyme can be chosen from horseradish peroxidase, soybean peroxidase, and combinations thereof.

In some cases, the peroxidase enzyme can be dissolved in the aqueous carrier. In other cases, the peroxidase enzyme can be encapsulated within carrier particles (e.g., nanoparticles, microparticles, or liposomes) to sequester the peroxidase enzyme and/or delay release of the peroxidase enzyme during injection.

In some embodiments, as discussed above, the peroxidase enzyme can be immobilized on proppant particles. For example, the peroxidase can be disposed in a coating present on the surface of the proppant particles. Alternatively, the peroxidase can be disposed within the proppant particles themselves. For example, in some cases, a biomaterial containing a peroxidase enzyme (e.g., soybean hulls containing soybean peroxidase) can be formed into or combined with a proppant particle. In certain embodiments, the peroxidase enzyme can be covalently bound to the surface of the proppant particles (e.g., by means of a bifunctional linker).

The peroxide can be any of the suitable peroxides discussed above. In certain embodiments, the peroxide can comprise hydrogen peroxide The viscosity-modifying polymer can comprise any of the suitable polymers discussed above. In some embodiments, the viscosity-modifying polymer can comprise a polyacrylamide. In certain embodiments, the polyacrylamide can further comprise a crosslinking agent. It will be understood that in some cases (e.g., PAM gel formation), the polymer at the surface, during injection, and for some time in the formation, may not significantly impact viscosity until contacted with another agent (cross-linker). This may occur at some point following injection (e.g., downhole, in situ within the subterranean formation, etc.). Accordingly, it will be understood that steps that recite, for example, injecting a fluid comprising a viscosity-modifying polymer include, for example, embodiments where a polymer that does not significantly impact viscosity when injected, but later impacts viscosity upon contacting another agent (e.g., a cross-linker), are injected.

Also provided are methods of slickwater fracturing a subterranean formation that comprise (a) injecting a fracturing fluid comprising a polyacrylamide friction reducing agent into the subterranean formation at a pressure sufficient to create or enlarge a fracture in the subterranean formation; and (b) breaking the viscosity of the fluid by fragmenting the polyacrylamide, wherein the polyacrylamide is fragmented by injecting a peroxidase enzyme and a peroxide into the subterranean formation.

In some embodiments, the peroxidase enzyme and the peroxide can be injected sequentially. For example, in some embodiments, the peroxidase enzyme can be injected first to position the enzyme within the subterranean formation, and the peroxide can be injected subsequently to begin fragmentation of the polyacrylamide friction reducing agent. In other embodiments, the peroxidase enzyme and the peroxide can be injected simultaneously. For example, the peroxidase enzyme and peroxide can be injected into the subterranean formation at the same time as components of a single composition.

The peroxidase enzyme can be any of the suitable peroxidase enzymes discussed above. In certain embodiments, the peroxidase enzyme can be chosen from horseradish peroxidase, soybean peroxidase, and combinations thereof.

In some cases, the peroxidase enzyme can be dissolved in the aqueous carrier. In other cases, the peroxidase enzyme can be encapsulated within carrier particles (e.g., nanoparticles, microparticles, or liposomes) to sequester the peroxidase enzyme and/or delay release of the peroxidase enzyme during injection.

In some embodiments, as discussed above, the peroxidase enzyme can be immobilized on proppant particles. For example, the peroxidase can be disposed in a coating present on the surface of the proppant particles. Alternatively, the peroxidase can be disposed within the proppant particles themselves. For example, in some cases, a biomaterial containing a peroxidase enzyme (e.g., soybean hulls containing soybean peroxidase) can be formed into or combined with a proppant particle. In certain embodiments, the peroxidase enzyme can be covalently bound to the surface of the proppant particles (e.g., by means of a bifunctional linker).

The peroxide can be any of the suitable peroxides discussed above. In certain embodiments, the peroxide can comprise hydrogen peroxide In some embodiments, the methods described herein can employ a polymer-degrading enzyme immobilized on proppant particles. The proppant particles can facilitate transport and localization of the polymer-degrading enzyme within a subterranean formation at regions of potential formation damage.

Accordingly, also provide are methods for degrading a polymer within a subterranean formation that comprise (a) providing a subterranean formation containing a polymer there within and a wellbore in fluid communication with the subterranean formation; and (b) injecting an enzyme breaker composition through the wellbore into the subterranean formation to degrade the polymer, wherein the enzyme breaker composition comprises proppant particles dispersed in an aqueous carrier, and a polymer-degrading enzyme immobilized on proppant particles.

In these methods, the polymer can be any polymer used in an oil and gas operation. For example, the polymer can comprise a polysaccharide, such as a galactomannan polymer (e.g. guar gum), a derivatized galactomannan polymer, starch, xanthan gum, a derivatized cellulose (e.g. hydroxycellulose or hydroxyalkyl cellulose); a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers.

In some cases, the polymer can be a water-soluble polymer. In certain cases, the polymer can comprise a biopolymer, such as a polysaccharide. For example, the polysaccharide can be chosen from cellulose, galactomannan, derivatives thereof, and combinations thereof. Other examples includes xanthan, starch, derivatives thereof, and combinations thereof. In some examples, the polysaccharide can comprise guar gum or a derivative thereof. Examples of guar derivatives include hydroxypropyl guar (HPG), carboxymethyl guar (CMG), and carboxymethyl hydroxypropyl guar (CMHPG). In some examples, the polysaccharide can comprise cellulose or a derivative thereof. Examples of cellulose derivatives include hydroxyethyl cellulose (HEC), hydroxypropyl cellulose, and carboxymethyl hydroxyethyl cellulose (CMHEC).

In certain embodiments, the polymer can comprise a carbon-carbon backbone. For example, the polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (e.g., styrene), acid-containing monomers (e.g., monomers comprising —COOH groups, such as acrylic acid or methacrylic acid; and monomers comprising sulfonic acid groups, such as vinylsulfonic acid, allylsulfonic acid, or 2-acrylamido-2-methylpropanesulfonic acid), and (meth)acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In other embodiments, the polymer can comprise a polyether. Examples of polyethers include poly(ethylene oxide) (also referred to as polyethylene glycol (PEG)), poly(propylene oxide) (also referred to as polypropylene glycol (PPG)), polytetramethylene glycol (PTMG), copolymers thereof, and combinations thereof.

In certain embodiments, the polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

In some embodiments, the polymer can be deposited on a surface within the subterranean formation. For example, the polymer can comprise a filter cake formed on a surface within the subterranean formation from a drilling fluid, a drill-in fluid, or a fracturing fluid. In certain embodiments, the polymer can comprise a polyacrylamide-containing filter cake in a well formed during drilling or completion of the well.

The polymer-degrading enzyme can be any suitable enzyme or enzymes that participates in a reaction that degrades or fragments the polymer. In some cases, the polymer-degrading enzyme can act on the polymer as a substrate, thereby fragmenting the polymer. In other embodiments, the polymer-degrading enzyme can participate in a reaction that generates a reactive intermediate (e.g., a free radical) that ultimately reacts with the polymer to degrade and/or fragment the polymer. For example, the polymer-degrading enzyme can be (depending on the nature of the polymer) a peroxidase, a cellulase, a hemicellulose, an asparaginase, a hydrolase, a xanthanase, an amylase, a pectinase, a glucosidase, a xylanase, a galactomannase, a galactosidase, a mannosidase, a glucanase, or a combination thereof.

One of ordinary skill in the art can select an appropriate polymer-degrading enzyme or enzymes in view of the polymer to be degraded. By way of example, hydrolases such as hemicellulase, cellulase, amylase and pectinase are known to react with guar, cellulose, starch and pectin polymers respectively. Other enzyme(s) known to target particular polymers include mannan endo-1,4-β-mannosidase and α-1,6-galactosidase (two o-glyosidic hydrolases that can hydrolyze linkages in guar), exo(1,4)-β-D-xylanase and endo(1,4)-β-D-xylanase and exo(1,4)-β-D-cellulase and endo(1,4)-β-D-cellulase (which can hydrolyze linkages in cellulose), β-(1,4)-D-glucanase (which can hydrolyze linkages in xanthan). Other examples of enzymes that can target glcosidic bonds include glucosidase, endo-glucosidase, exo-glucosidase, endo-xylanase, exo-xylanase, and galactomannanase.

In some embodiments, the polymer-degrading enzyme can comprise a cocktail of enzymes that randomly hydrolyzes polymers such as polysaccharides. By way of example, in some embodiments, the polymer-degrading enzyme can comprise a combination of hydralases, such as a combination of hemicellulase, cellulase, amylase, and/or pectinase In other embodiments, the polymer-degrading enzyme can comprise a polymer that can degrade a wide variety of polymers. By way of example, in certain embodiments, the polymer-degrading enzyme can comprise a peroxidase. In these embodiments, the method can further comprise injecting a peroxide into the subterranean formation.

The polymer-degrading enzyme or enzymes can be immobilized on the proppant particles by any suitable means. For example, the polymer-degrading enzyme or enzymes can be disposed in a coating present on the surface of the proppant particles. Alternatively, the polymer-degrading enzyme or enzymes can be disposed within the proppant particles themselves. For example, in some cases, a biomaterial containing a peroxidase enzyme (e.g., soybean hulls containing soybean peroxidase) can be formed into or combined with a proppant particle. In certain embodiments, the polymer-degrading enzyme or enzymes can be covalently bound to the surface of the proppant particles (e.g., by means of a bifunctional linker).

Also provided herein are methods for degrading polymers within fluid handling systems associated with oil and gas operations. For example, the methods described herein can be used to degrade and/or remove accumulated polymer deposited within above-ground fluid handling systems associated with oil and gas operations, including fluid lines, filters, separator tanks, settling tanks, and storage tanks. Methods for degrading polymers within fluid handling systems can comprise contacting the components of the fluid handling system with a peroxidase enzyme and a peroxide (e.g., a composition comprising a peroxidase enzyme and a peroxide), thereby fragmenting the polymer. In some embodiments, this can comprise flowing a peroxidase enzyme and a peroxide (e.g., a composition comprising a peroxidase enzyme and a peroxide) through the components of the fluid handling system. In some embodiments, methods can further comprise washing or flushing the components of the fluid handling system with a fluid (e.g., water) to remove the degraded polymer.

In these methods, the polymer can be any polymer used in an oil and gas operation. For example, the polymer can comprise a polysaccharide, such as a galactomannan polymer (e.g. guar gum), a derivatized galactomannan polymer, starch, xanthan gum, a derivatized cellulose (e.g. hydroxycellulose or hydroxyalkyl cellulose); a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers.

In some cases, the polymer can be a water-soluble polymer. In certain cases, the polymer can comprise a biopolymer, such as a polysaccharide. For example, the polysaccharide can be chosen from cellulose, galactomannan, derivatives thereof, and combinations thereof. Other examples include xanthan, starch, derivatives thereof, and combinations thereof. In some examples, the polysaccharide can comprise guar gum or a derivative thereof. Examples of guar derivatives include hydroxypropyl guar (HPG), carboxymethyl guar (CMG), and carboxymethyl hydroxypropyl guar (CMHPG). In some examples, the polysaccharide can comprise cellulose or a derivative thereof. Examples of cellulose derivatives include hydroxyethyl cellulose (HEC), hydroxypropyl cellulose, and carboxymethyl hydroxyethyl cellulose (CMHEC).

In certain embodiments, the polymer can comprise a carbon-carbon backbone. For example, the polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (e.g., styrene), acid-containing monomers (e.g., monomers comprising —COOH groups, such as acrylic acid or methacrylic acid; and monomers comprising sulfonic acid groups, such as vinylsulfonic acid, allylsulfonic acid, or 2-acrylamido-2-methylpropanesulfonic acid), and (meth)acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In other embodiments, the polymer can comprise a polyether. Examples of polyethers include poly(ethylene oxide) (also referred to as polyethylene glycol (PEG)), poly(propylene oxide) (also referred to as polypropylene glycol (PPG)), polytetramethylene glycol (PTMG), copolymers thereof, and combinations thereof.

In certain embodiments, the polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

The peroxidase enzyme can be any suitable peroxidase enzyme, such as a heme peroxidasae or a non-heme peroxidase. Examples of suitable peroxidases include catalase, Dyp-type peroxidase, Di-Heme cyctochrome c peroxidase (DiHCcP), haloperoxidase, non-animal peroxidases (e.g., class I peroxidases such as ascorbate peroxidase, catalase peroxidase, cyctochrome c peroxidase, hybrid ascorbate cyctochrome c peroxidase; class II peroxidases such as lignin peroxidase, manganese peroxidase, and versatile peroxidase; class III peroxidases, such as horseradish peroxidase and soybean peroxidase; and other non-animal peroxidases), animal peroxidases (e.g., prostaglandin H synthase/cyclooxygenase, linoleate diol synthase (PGHS-like), alpha dioxygenase, dual oxidase, peroxidasins, peroxinectins, non-mammalian vertebrate peroxidase, thyroid peroxidase, myelo-peroxidase (MPO), lacto-peroxidase, and eosinophil peroxidase), manganese catalase, NADH peroxidase, thiol peroxidases (e.g., glutathione peroxidase and peroxiredoxins, such as 1-cysteine peroxiredoxin, 2-cysteine peroxiredoxin, 2-cysteine peroxiredoxin, and 2-cysteine peroxiredoxin), haloperoxidases (e.g., no heme, no metal haloperoxidase and no heme, vanadium haloperoxidase), and alkylhydroperoxidase D-like peroxidases (e.g., alkylhydroperoxidase D, carboxymuconolactone decarboxylase, hydrolase-CMD fusion, and double CMD). Other examples of peroxidases include chloride peroxidase, vanadium bromoperoxidase, hemoproteins (hemoglobin, myoglobin), and peroxidase class EC 1.11.1.x. In some embodiments, the peroxidase enzyme can be chosen from horseradish peroxidase, soybean peroxidase, and combinations thereof.

In some cases, the peroxidase enzyme can be dissolved in the aqueous carrier. In other cases, the peroxidase enzyme can be encapsulated within carrier particles (e.g., nanoparticles, microparticles, or liposomes) to sequester the peroxidase enzyme and/or delay release of the peroxidase enzyme during injection.

The peroxide can be any suitable peroxide (e.g., any compound or molecule that includes a peroxide moiety). For example, in some embodiments, the peroxide can be an organic peroxide, such as benzoyl peroxide or methyl ethyl ketone peroxide. In other embodiments, the peroxide can be an inorganic peroxide, such as a persulfate (e.g., potassium persulfate, ammonium persulfate, sodium persulfate, potassium peroxymonosulfate, or sodium peroxymonosulfate). In certain embodiments, the peroxide can comprise hydrogen peroxide. The peroxide can also be a compound, molecule, or combination thereof that itself does not include a peroxide moiety, but which reacts or is modified at some point during or after injection to generate a compound or molecule that includes a peroxide moiety.

The methods described herein can also be employed to control delivery of an active agent to a subterranean formation. For example, provided herein are methods of releasing an active agent into a subterranean formation that comprise (a) providing a subterranean formation containing a wellbore in fluid communication with the subterranean formation; (b) injecting an active agent encapsulated in a polymeric particle through the wellbore into the subterranean formation; and (c) injecting a peroxidase enzyme dissolved or dispersed in an aqueous carrier and a peroxide through the wellbore into the subterranean formation, wherein the polymeric particle is fragmented by the peroxidase enzyme and the peroxide thereby releasing the active agent into the subterranean formation. Using these methods, the release of the active agent can be controlled (e.g., based on time, physical location within the reservoir, or a combination thereof). These methods can also be used to deliver unstable or otherwise reactive active agents, which remain encapsulated in the polymeric particle until released.

The polymeric particles can comprise, for example, microparticles or nanoparticles formed from a polymer. Any suitable polymer may be used to form the particles. For example, the polymer can comprise a polysaccharide, such as a galactomannan polymer (e.g. guar gum), a derivatized galactomannan polymer, starch, xanthan gum, a derivatized cellulose (e.g. hydroxycellulose or hydroxyalkyl cellulose); a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers.

In certain embodiments, the polymer can comprise a carbon-carbon backbone. For example, the polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (e.g., styrene), acid-containing monomers (e.g., monomers comprising —COOH groups, such as acrylic acid or methacrylic acid; and monomers comprising sulfonic acid groups, such as vinylsulfonic acid, allylsulfonic acid, or 2-acrylamido-2-methylpropanesulfonic acid), and (meth)acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In certain embodiments, the polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

The active agent can be any agent to be delivered to a subsurface formation. Problems with the subsurface well environments include fouling of extraction wells by scale formation, well corrosion, and souring of oil by bacterial contamination. Active agents for preventing or removing scaling, preventing souring, preventing corrosion, and other useful down-well applications are known, and can be delivered using these methods.

For example, compositions for preventing and/or removing scaling include the phosphonate compositions disclosed by Pardue et al. (U.S. Pat. No. 5,018,577), which is hereby incorporated in its entirety.

Biocides are used to control unwanted organisms in the well environment. In particular, antibiotics are used against the sulfophilic bacteria responsible for sulfide production that results in product souring and damage to well equipment. Typical antibiotics suitable for use in the present invention include those antibiotics known for use against sulfophilic bacteria in petroleum wells.

Anti-corrosion agents, such as are known in the art can help reduce the amount of maintenance that a production well requires, due to equipment corrosion.

To retard "coning" and assist in the extraction of higher viscosity oil despite the presence of lower viscosity water, surfactants and/or dispersants such as are known in the art can also be encapsulated and delivered using the methods described herein.

The peroxidase enzyme can be any suitable peroxidase enzyme, such as a heme peroxidasae or a non-heme peroxidase. Examples of suitable peroxidases include catalase, Dyp-type peroxidase, Di-Heme cyctochrome c peroxidase (DiHCcP), haloperoxidase, non-animal peroxidases (e.g., class I peroxidases such as ascorbate peroxidase, catalase peroxidase, cyctochrome c peroxidase, hybrid ascorbate cyctochrome c peroxidase; class II peroxidases such as lignin peroxidase, manganese peroxidase, and versatile peroxidase; class III peroxidases, such as horseradish peroxidase and soybean peroxidase; and other non-animal peroxidases), animal peroxidases (e.g., prostaglandin H synthase/cyclooxygenase, linoleate diol synthase (PGHS-like), alpha dioxygenase, dual oxidase, peroxidasins, peroxinectins, non-mammalian vertebrate peroxidase, thyroid peroxidase, myelo-peroxidase (MPO), lacto-peroxidase, and eosinophil peroxidase), manganese catalase, NADH peroxidase, thiol peroxidases (e.g., glutathione peroxidase and peroxiredoxins, such as 1-cysteine peroxiredoxin, 2-cysteine peroxiredoxin, 2-cysteine peroxiredoxin, and 2-cysteine peroxiredoxin), haloperoxidases (e.g., no heme, no metal haloperoxidase and no heme, vanadium haloperoxidase), and alkylhydroperoxidase D-like peroxidases (e.g., alkylhydroperoxidase D, carboxymuconolactone decarboxylase, hydrolase-CMD fusion, and double CMD). Other examples of peroxidases include chloride peroxidase, vanadium bromoperoxidase, hemoproteins (hemoglobin, myoglobin), and peroxidase class EC 1.11.1.x. In some embodiments, the peroxidase enzyme can be chosen from horseradish peroxidase, soybean peroxidase, and combinations thereof.

In some cases, the peroxidase enzyme can be dissolved in the aqueous carrier. In other cases, the peroxidase enzyme can be encapsulated within carrier particles (e.g., nanoparticles, microparticles, or liposomes) to sequester the peroxidase enzyme and/or delay release of the peroxidase enzyme during injection.

The peroxide can be any suitable peroxide (e.g., any compound or molecule that includes a peroxide moiety). For example, in some embodiments, the peroxide can be an organic peroxide, such as benzoyl peroxide or methyl ethyl ketone peroxide. In other embodiments, the peroxide can be an inorganic peroxide, such as a persulfate (e.g., potassium persulfate, ammonium persulfate, sodium persulfate, potassium peroxymonosulfate, or sodium peroxymonosulfate). In certain embodiments, the peroxide can comprise hydrogen peroxide. The peroxide can also be a compound, molecule, or combination thereof that itself does not include a peroxide moiety, but which reacts or is modified at some point during or after injection to generate a compound or molecule that includes a peroxide moiety.

Compositions

Also provided are compositions that comprise a viscosity-modifying polymer and a population of proppant particles dispersed in an aqueous carrier, wherein the proppant particles further comprise a polymer-degrading enzyme immobilized on proppant particles. In some embodiments, the polymer-degrading enzyme can be covalently bound to the surface of the proppant particles.

The composition can comprise from greater than 0% to 5% by weight (e.g., from 1% to 5% by weight, from greater than 0% to 2.5% by weight, from 1% to 2.5% by weight, or from 2.5% to 5% by weight) proppant particles and from greater than 0% to 10% by weight (e.g., from 1% to 10% by weight, from greater than 0% to 7.5% by weight, from 1% to 7.5% by weight, from greater than 0% to 5% by weight, from 1% to 5% by weight, from greater than 0% to 2.5% by weight, from 1% to 2.5% by weight, from 2.5% to 10% by weight, from 2.5% to 7.5% by weight, or from 2.5% to 5% by weight) viscosity-modifying polymer, based on the total weight of the composition.

The viscosity-modifying polymer can be any polymer used in an oil and gas operation. For example, the viscosity-modifying polymer can comprise a polysaccharide, such as a galactomannan polymer (e.g. guar gum), a derivatized galactomannan polymer, starch, xanthan gum, a derivatized cellulose (e.g. hydroxycellulose or hydroxyalkyl cellulose); a polyvinyl alcohol polymer; or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for oil well treatment polymers.

In some cases, the viscosity-modifying polymer can be a water-soluble polymer. In certain cases, the viscosity-modifying polymer can comprise a biopolymer, such as a polysaccharide. For example, the polysaccharide can be chosen from cellulose, galactomannan, derivatives thereof, and combinations thereof. Other examples includes xanthan, starch, derivatives thereof, and combinations thereof. In some examples, the polysaccharide can comprise guar gum or a derivative thereof. Examples of guar derivatives include hydroxypropyl guar (HPG), carboxymethyl guar (CMG), and carboxymethyl hydroxypropyl guar (CMHPG). In some examples, the polysaccharide can comprise cellulose or a derivative thereof. Examples of cellulose derivatives include hydroxyethyl cellulose (HEC), hydroxypropyl cellulose, and carboxymethyl hydroxyethyl cellulose (CMHEC).

In certain embodiments, the viscosity-modifying polymer can comprise a carbon-carbon backbone. For example, the viscosity-modifying polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (e.g., styrene), acid-containing monomers (e.g., monomers comprising —COOH groups, such as acrylic acid or methacrylic acid; and monomers comprising sulfonic acid groups, such as vinylsulfonic acid, allylsulfonic acid, or 2-acrylamido-2-methylpropanesulfonic acid), and (meth)acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In other embodiments, the polymer can comprise a polyether. Examples of polyethers include poly(ethylene oxide) (also referred to as polyethylene glycol (PEG)), poly(propylene oxide) (also referred to as polypropylene glycol (PPG)), polytetramethylene glycol (PTMG), copolymers thereof, and combinations thereof.

In certain embodiments, the viscosity-modifying polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

In some cases, as discussed above, viscosity-modifying polymer can be a polymer that, own its own at the surface, during injection, or for some time in the formation, does not significantly impact viscosity until contacted with another agent (e.g., a cross-linker).

The polymer-degrading enzyme can be any suitable enzyme or enzymes that participates in a reaction that degrades or fragments the viscosity-modifying polymer. In some cases, the polymer-degrading enzyme can act on the viscosity-modifying polymer as a substrate, thereby fragmenting the polymer. In other embodiments, the polymer-degrading enzyme can participate in a reaction that generates a reactive intermediate (e.g., a free radical) that ultimately reacts with the viscosity-modifying polymer to degrade and/or fragment the viscosity-modifying polymer. For example, the polymer-degrading enzyme can be (depending on the nature of the viscosity-modifying polymer) a peroxidase, a cellulase, a hemicellulose, an asparaginase, a hydrolase, a xanthanase, an amylase, a pectinase, a glucosidase, a xylanase, a galactomannase, a galactosidase, a mannosidase, a glucanase, or a combination thereof.

One of ordinary skill in the art can select an appropriate polymer-degrading enzyme or enzymes in view of the viscosity-modifying polymer to be degraded. By way of example, hydrolases such as hemicellulase, cellulase, amylase and pectinase are known to react with guar, cellulose, starch and pectin polymers respectively. Other enzyme(s) known to target particular polymers include mannan endo-1,4-β-mannosidase and α-1,6-galactosidase (two o-glyosidic hydrolases that can hydrolyze linkages in guar), exo (1,4)-β-D-xylanase and endo(1,4)-β-D-xylanase and exo(1, 4)-β-D-cellulase and endo(1,4)-β-D-cellulase (which can hydrolyze linkages in cellulose), β-(1,4)-D-glucanase (which can hydrolyze linkages in xanthan). Other examples of enzymes that can target glcosidic bonds include glucosidase, endo-glucosidase, exo-glucosidase, endo-xylanase, exo-xylanase, and galactomannanase.

In some embodiments, the polymer-degrading enzyme can comprise a cocktail of enzymes that randomly hydrolyzes polymers such as polysaccharides. By way of example, in some embodiments, the polymer-degrading enzyme can comprise a combination of hydralases, such as a combination of hemicellulase, cellulase, amylase, and/or pectinase In other embodiments, the polymer-degrading enzyme can comprise a polymer that can degrade a wide variety of polymers. By way of example, in certain embodiments, the polymer-degrading enzyme can comprise a peroxidase. In these embodiments, the composition can further comprise a peroxide. The peroxide can be any suitable peroxide (e.g., any compound or molecule that includes a peroxide moiety). For example, in some embodiments, the peroxide can be an organic peroxide, such as benzoyl peroxide or methyl ethyl ketone peroxide. In other embodiments, the peroxide can be an inorganic peroxide, such as a persulfate (e.g., potassium persulfate, ammonium persulfate, sodium persulfate, potassium peroxymonosulfate, or sodium peroxymonosulfate). In certain embodiments, the peroxide can comprise hydrogen peroxide.

The size and composition of the proppant can vary, depending upon the specific application for the composition. The size and composition of the proppant particles can be selected for the ability to maintain a highly conductive, productive channel for oil and gas production under the specific well conditions and pressure. Examples of suitable proppant particles include silica sand, resin-coated silica sand, ceramic, and combinations thereof.

In some cases, the proppant particles can have an average particle size of from 50 microns to 2500 microns (e.g., from 50 microns to 2000 microns, from 50 microns to 1000 microns, from 50 microns to 500 microns, from 50 microns to 250 microns, from 50 microns to 150 microns, from 50 microns to 100 microns, from 75 microns to 2500 microns, from 75 microns to 2000 microns, from 75 microns to 1000 microns, from 75 microns to 500 microns, from 75 microns to 250 microns, from 75 microns to 150 microns, from 75 microns to 100 microns, from 100 microns to 2500 microns, from 100 microns to 2000 microns, from 100 microns to 1000 microns, from 100 microns to 500 microns, from 100 microns to 250 microns, from 100 microns to 150 microns, from 250 microns to 2500 microns, from 250 microns to 2000 microns, from 250 microns to 1000 microns, from 250 microns to 500 microns, from 500 microns to 2500 microns, from 500 microns to 2000 microns, from 500 microns to 1000 microns, from 1000 microns to 2500 microns, from 1000 microns to 2000 microns, or from 2000 microns to 2500 microns).

The polymer-degrading enzyme or enzymes can be immobilized on the proppant particles by any suitable means. For example, the polymer-degrading enzyme or enzymes can be disposed in a coating present on the surface of the proppant particles. Alternatively, the polymer-degrading enzyme or enzymes can be disposed within the proppant particles themselves. For example, in some cases, a biomaterial containing a peroxidase enzyme (e.g., soybean hulls containing soybean peroxidase) can be formed into or combined with a proppant particle. In certain embodiments, the polymer-degrading enzyme or enzymes can be covalently bound to the surface of the proppant particles (e.g., by means of a bifunctional linker).

By way of non-limiting illustration, examples of certain embodiments of the present disclosure are given below.

EXAMPLES

Example 1: Enzymatic Degradation of Polyacrylamide in Aqueous Solution with Peroxidase and $H_2O_2$ Polyacrylamides are often used in water based hydraulic fracturing for natural gas and oil production. However, residual polymer remaining in the fractured rock can decrease production.

Herein, methods for degrading partially hydrolyzed polyacrylamide (HPAM) using hydrogen peroxide catalyzed by the enzyme, Horseradish peroxidase (HRP), were investigated. This sustainable HRP/$H_2O_2$ system degraded the polymer in solution reducing its viscosity in both pure water and brine solutions. Molecular weight measurements confirmed that the viscosity reduction was due to a significant degradation of the polymer backbone and not primarily by amide hydrolysis or rearrangement, etc. Some kinetic data for the change in viscosity and molecular weight was also measured and correlated. The reduction in viscosity and molecular weight was first order with the $H_2O_2$ concentration. The kinetics of viscosity reduction and molecular weight were found to be closely correlated.

Introduction

Conventional hydraulic fracturing processes for oil and gas reservoir development often employ carbohydrate polymers, such as guar and xanthan gums, to provide a higher viscosity solutions for efficient fracturing and, importantly, dispersal of the sand or ceramic proppant required to maintain the fracture aperture after the pressure is reduced. The high viscosity of the fracturing fluid suspends the proppant for transport into the fractures and reduces the effect of gravitational settling that would otherwise result in poor distribution of the proppant. The proppant used in fracturing varies from well to well but generally there are three main types: silica sand, resin coated sand, and ceramic. The type and size of proppant are chosen for its ability to maintain a highly conductive, productive channel for oil and gas production under the specific well conditions. In general, the fracture conductivity (the rate of flow of oil or gas) is determined by the proppant strength and uniformity with the strongest, most uniform proppant resulting in the highest fracture conductivity and production yields.

The use of polymers for proppant transport and suspension can create formation damage due to "filter cake" formation on the fracture faces, as well as loss of fracture conductivity, and the polymer must be degraded using breakers to take advantage of the increased surface area provided by the fractures. In conventional fracturing, carbohydrate polymer degradation is commonly performed using acids, oxidizers and enzymes that are intended to hydrolyze the polymer backbone and reduce the viscosity. Although carbohydrate polymers have shown to be successful in conventional fracturing these polymers are not well suited for use in low permeability formations.

In unconventional low permeability reservoirs, such as tight shale formations, so-called "slick water" injection is employed. In this application, large volumes of fluid are injected at a high flow rate. Low concentrations of high molecular weight polyacrylamide (PAM), or partially hydrolyzed polyacrylamide (HPAM), are used as a friction reducer to reduce the amount of pumping power needed. Although a low concentration of PAM is used (usually on the order of parts-per-thousand), the high volumes of fluid injected lead to the buildup of PAM ("filter cake") that can create formation damage. Moreover, the C—C backbone found in vinyl polymers, such as PAM, makes degradation especially difficult even when exposed to oxidizers. PAM and HPAM polymers have been shown to be stable at temperatures as high as 200° C., making the use of conventional PAM chemical oxidizing breakers challenging. To date, sustainable alternatives to traditional harsh chemical breakers for degrading vinyl polymers have not been successfully implemented.

Enzymes are a diverse group of protein catalysts that reduce the activation energy required to perform a specific reaction. As proteins, they are inherently biodegradable and produced from renewable sources. Enzymes are of particular interest in industry due to their high specificity, and very low environmental impact. Unlike stoichiometric reactions, enzymes are not consumed by the reaction, and generally remain active as long as the protein is not denatured or its active site is not degraded. Carbohydrate polymers used in conventional fracturing can often be degraded by enzyme catalyzed hydrolysis (e.g. amylase, pectinase, cellulase etc.) but there are no known enzymes capable of directly hydrolyzing the carbon-carbon backbone of PAM polymers.

Peroxidase enzymes are capable of producing chemical radicals from peroxides (inorganic or organic) that can be used to degrade polymers. Here, horseradish peroxidase (HRP) is used in conjunction with hydrogen peroxide ($H_2O_2$) to degrade a high molecular weight, commercially available partially hydrolyzed polyacrylamide currently used in hydraulic fracturing fluids. Hydrogen peroxide is considered a sustainable/green liquid oxidant as it is relatively stable and produces only water as a byproduct of oxidation. HRP is one of the most widely used enzymes with industrial applications in the biotechnology, bioremediation, and medical fields. Specific applications include chemiluminescent and immunoassays as well as applications in organic synthesis, biotransformation, wastewater treatment of aromatic compounds, etc. Overall, the use of HRP/hydrogen peroxide system might serve as a more technically effective and sustainable method to degrade PAM used in hydraulic fracturing applications.

Background

Hydrolysis and chain scission of PAM can occur via mechanical, photo, thermal and chemical processes. Of these processes, photo, mechanical shear, and chemical means of degradation have all been attributed to free radical generation. PAM is thought to have three sites vulnerable to attack as shown in Scheme 1. In the case of HPAM, some $NH_2$ groups on the PAM side chain are be replaced by a hydroxyl (OH) to form carboxylic acid or carboxylates (depending on pH). After radical attack, the cleaved C—C bond can undergo recombination or disproportionation. Furthermore, the radical may undergo chain transfer and chain propagation in addition to the termination mechanisms. For reduction in molecular weight, termination by disproportionation resulting in two polymeric components is preferred and can take place via two routes. The first consists of two radical containing chains coming together to quench the reaction through formation of an unsaturated double bond and saturated end groups. The second mechanism involves the addition of the radical carrier to the oxidized polymer chain if an additional radical carrier is present in the reaction.

Scheme 1: Structure of PAM monomer illustrating sites vulnerable to free radical attack.

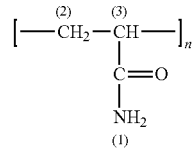

Several studies have shown that the C—C backbone of PAM is susceptible to degradation by chemically generated free radical attack. In dilute solutions, radical initiators such as potassium persulfate and ammonium persulfate have been shown to be effective in combination with the peroxide-FeSO$_4$ redox system. Degradation of PAM in the presence of persulfate increases with increasing PAM molecular weight, reaction temperature, and persulfate concentration with much greater degradation in the presence of K$_2$S$_2$O$_8$ when compared to H$_2$O$_2$ alone. Furthermore, C—C bond cleavage has been observed in the presence of dissolved oxygen using Fenton reagent, as well as Fe$^{2+}$. Fenton reagent was shown not to degrade much PAM in the absence of oxygen. Increased oxygen concentration has been directly related to PAM degradation under a variety of reservoir conditions. Common commercial oxidizers, including persulfate, can reduce the apparent viscosity of PAM, used for fracturing processes, in both fresh water and brine based solutions at 82° C.

Biologically, PAM is also susceptible to microbial degradation by several bacterial strains but with very low efficiency. Two bacterial strains can slowly utilize PAM as the sole carbon source; HPAM can act as both nitrogen and carbon source. Enzymatically, only a few studies exist for the degradation of PAM. The degradation of PAM can be catalyzed by superoxide radical formation through reduction of dissolved oxygen during the xanthine oxidase catalyzed oxidation of xanthine. Hydroquinone peroxidase enzymes can also facilitate the degradation of PAM, as well as other carbon backbone containing polymers, in the presence of tetramethylhydroquinone and peroxide. These peroxidase enzymes require cofactors for polymer degradation, thus three reagents in all: enzyme, H$_2$O$_2$, and cofactor.

Peroxidase enzymes are a group of biological catalysts that can perform a range of chemistries. As their name suggests, their primary biological function is to catalyze the degradation of peroxide to water and oxygen. Horseradish peroxidase (HRP) has been extensively studied for almost a century. As it has many commercial applications in biosensing, biocatalysis, and bioremediation, it is produce in relatively large quantities for an enzyme. HRP is a heme-containing, higher order class III peroxidase that belongs to the plant peroxidase superfamily. HRP has been shown to contain 19 isoenzymes that vary in slightly in molecular weight (31.3-35.9 kDa), isoelectric points (4.84-9.30), and N-glycosylation sites (2-9). HRP has the ability to oxidize many phenol-like compounds for bioremediation and dye removal. HRP can exhibit 97-99% efficiency at the removal of a variety of phenol compounds at around room temperature in as little as 1 hour.

Horseradish peroxidase is known for its ability to create radicals in the presence of hydrogen peroxide and a reductant. The general reaction scheme is shown in Reactions 1-4 where Reaction 4 is the overall chemical balance and Compounds I and II are the oxidized forms of HRP (the heme group in the active site).

$$HRP + H_2O_2 \rightarrow \text{Compound I} + H_2O \quad\quad 1$$

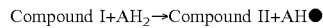

$$\text{Compound I} + AH_2 \rightarrow \text{Compound II} + AH\bullet \quad\quad 2$$

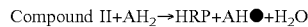

$$\text{Compound II} + AH_2 \rightarrow HRP + AH\bullet + H_2O \quad\quad 3$$

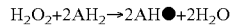

$$H_2O_2 + 2AH_2 \rightarrow 2AH\bullet + 2H_2O \quad\quad 4$$

The first step in this reaction shows that HRP is transformed to the active form Compound I in the presence of hydrogen peroxide. Here, the iron in the heme group in HRP transforms from Fe(III) to a radical cationic Fe=O (IV) form. Compound I can now react with a reductant (AH$_2$) (here HPAM) to begin the degradation process. Upon reaction, Compound I transforms to a different oxidation state, Compound II. Compound II can then react with another reductant reverting back to native HRP. In the overall material balance shown in Reaction 4, HRP catalyzes the initial degradation of two reductant molecules for each peroxide molecule. The enzyme can also become deactivated in certain concentrations of peroxide and other conditions through oxidation of amino acids and amino acid residues on the enzyme.

To improve the efficiency of these reactions, nature often uses synthetic electron carriers to act as a temporary reductant (AH$_2$). Nicotinamide adenine dinucleotide (NADH) is a naturally occurring electron transfer agent that is used in cellular metabolism and is considered a model compound. The addition of NADH has been shown to create the oxidized form of NADH (NAD$\bullet$) in the cycle. The radical form of NAD$\bullet$ can react with O$_2$ to create a superoxide radical in an additional oxidative cycle. Furthermore, the addition of a reductant has been shown to protect against peroxide inactivation. Kinetically, the catalytic cycle has been characterized using computer simulation of 11 elementary reactions and 9 rate equations. The role of this type of cofactor in polymer degradation is also investigated here.

Materials and Methods

Polymer and Enzyme Systems

Partially hydrolyzed polyacrylamide AlcoFlood 935 was obtained from Ciba Specialty Chemicals (HPAM; Lot A2247BOV, Nominal M$_w$=6,000 kDa; degree of hydrolysis: 5-10%). Alcoflood 935 was added to room temperature 18 MΩ, reverse-osmosis water (LabconcoWaterPro RO/PS system) or 2% (w/vol) Potassium Chloride (Fisher Scientific) solution to form a 2 mg/ml polymer stock solution (2000 ppm mass). The solution was stirred slowly for approximately 12 hours to ensure complete dissolution of the polymer. The polymer solution was vacuum filtered prior to use through an 8 μm filter paper (Micron Separations Inc.) to remove any undissolved polymer aggregates. Horseradish peroxidase Type II (HRP; M$_w$=44,000), essentially salt-free, lyophilized powder, 150-250 units/mg solid (using pyrogallol) (Sigma) and β-nicotinamide adenine dinucleotide (NADH) (Sigma-Aldrich) were added to the Alcoflood 935 stock solution immediately before each experiment. Solution concentrations were 2000 ppm (2 mg/ml) Alcoflood 935 polymer solution with the addition of 45.5 μM (2 mg/ml) HRP and/or 1.41 mM (1 mg/ml) NADH to the polymer solution unless specified otherwise. Reactions were initiated by addition of 10 μL/ml (peroxide solution/reaction solution) at concentrations of 9.77, 4.89, and 0.977 M. The resulting in final peroxide concentrations for solutions were 96.9, 48.4, and 9.69 mM. For samples not containing peroxide, water was added to maintain a constant dilution of other components. After peroxide/water dilution, the final concentrations of HPAM, HRP, and NADH were 1980 ppm, 45.0 μM, and 1.40 mM respectively. Solutions containing differing HRP concentrations were made in an identical manner to the previously mentioned method. Final solution concentrations are used to designate specific concentrations throughout this paper. The pH of 1980 ppm Alcoflood solution without the addition of the reagents 7.6±0.01. However, with reagents, the pH was between 6.5 and 7.4 with maximum deviation of ±0.05.

Viscosity Measurements

Viscosities were measured using three digital cone-and-plate viscometers at 25° C. (±0.1° C.). For method development, viscosity data was obtained using a Brookfield DVII+ Pro instrument equipped with an SP-40 0.8°/40 mm cone and plate (Brookfield Engineering, Middleboro, Mass.) at 75 s$^{-1}$. The accuracy of the Brookfield DVII+ Pro is ±1.0% of the full scale spindle/speed viscosity range. Data presented in the following plots was measured using a Bohlin CS10 Rheometer (Malvern Instruments Ltd, Worcestershire, UK) with a 4°/40 mm cone and plate geometry or an Anton Paar MCR 302 model rheometer (Anton Paar, Graz, Austria) equipped with a CP-50, 1°/50 mm attachment. All samples were prepared in triplicate and incubated at 37° C. Initial viscosities ($\mu_o$) were obtained by measuring samples diluted with water in place of peroxide. For samples tested after extended incubation times, samples containing water were subjected to the same conditions as those containing peroxide. To determine the viscosity reduction with respect to time, 14 ml solutions were made and incubated at 37° C. These solutions were sampled periodically over a 24 hour period by removing a 1.5ml aliquot and immediately determining the viscosity using the Bohlin CS10 Rheometer at 75 $s^{-1}$ and 25° C. (±0.1° C.). Individual measurements with the Bohlin CS10 Rheometer showed deviations of 1.0-0.1% depending on shear rate and viscosity. Reported results are the average from at least three separate runs/measurements reported with error bars representing sample standard deviation from the mean. The viscosity results were fit with the Ostwald de Waele Model (Equation 1) where the flow consistency index (K) and the power law index (n) are reported where in the graphical legends. The power law index can indicate solution trend changes where n =1 is a Newtonian fluid, n>1 is a shear thickening fluid, and n <1 is a shear thinning fluid.

$$\mu = K\gamma^{n-1} \text{ or } \sigma = K\gamma^n \qquad 1$$

Size Exclusion Chromatography (SEC)

Molecular weight of the polymer, before and after degradation, was obtained using two ViscoGEL 08025 GMPWXL columns (Viscotek, Houston, Tex.) connected in series to a PL-2100 ELSD evaporative light scattering detector (Polymer Laboratories Ltd., Amherst, Mass.). The detector has a sensitivity range of 1-50 ng on the column. Samples were injected using a Varian Prostar model 410 autosampler (relative standard deviation <0.5% using partial loop) and the mobile phase was delivered using dual model 210 Varian Prostar solvent delivery modules (Varian, Palo Alto, Calif.) with flowrate accuracy of ±1.0% and reproducibility of ±0.1%. The mobile phase was 20% acetonitrile (Fisher Scientific, Pittsburg, Pa.) and 80% 0.1M ammonium acetate (Fisher Scientific Pittsburg, Pa.). Samples were tested at room temperature with a mobile phase flow rate of 1 mL/min and a sample injection volume of 45.0 µL. PAM Molecular weight standards of 27.5, 53.2, 99.0, 201, 1100 (American Polymer Standards, Mentor, Ohio) and 5000 KDa (Polysciences Inc, Warrington, Pa.) were used for calibration. The number average ($M_n$) and weight average ($M_w$) molecular weights were determined from the chromatograms. Reported results are the average from at least three separate runs/measurements reported with standard deviations.

Results and Discussion

Polyacrylamides are usually recalcitrant to enzymes and all but the harshest chemical agents for degradation due to the carbon-carbon backbone. This is particularly problematic for their use in hydraulic fracturing for oil and gas production where the polymer residue hinders flow. Hydrogen peroxide is considered a green oxidant, but, by itself, is incapable of degrading most polymers (see below). Horseradish Peroxidase (HRP) is used to catalyze and activate $H_2O_2$ to degrade partially hydrolyzed polyacrylamide (HPAM) in solution. This degradation is characterized first by viscosity measurements and then confirmed by molecular weight measurements.

Viscosity

Control experiments were conducted to identify the effect of each of the components on nominal initial viscosity ($\eta_0$ at t=0) at different shear rates of the polymer solution with different additives viz. water, peroxide solution, HRP solution, and NADH solution (FIG. 1). The baseline polymer solution, label HPAM, has the highest viscosity. The addition of any of additive, in amounts similar to the degradation experiments, to the stock polymer solution decreased the viscosity at all shear rates. The dissolved enzyme, HRP, seemed to have a larger effect on diminishing the viscosity than the other components. Power law constants shown in FIG. 1 are representative of the loss in viscosity and shear thinning associated with addition of components.

Figure 2:
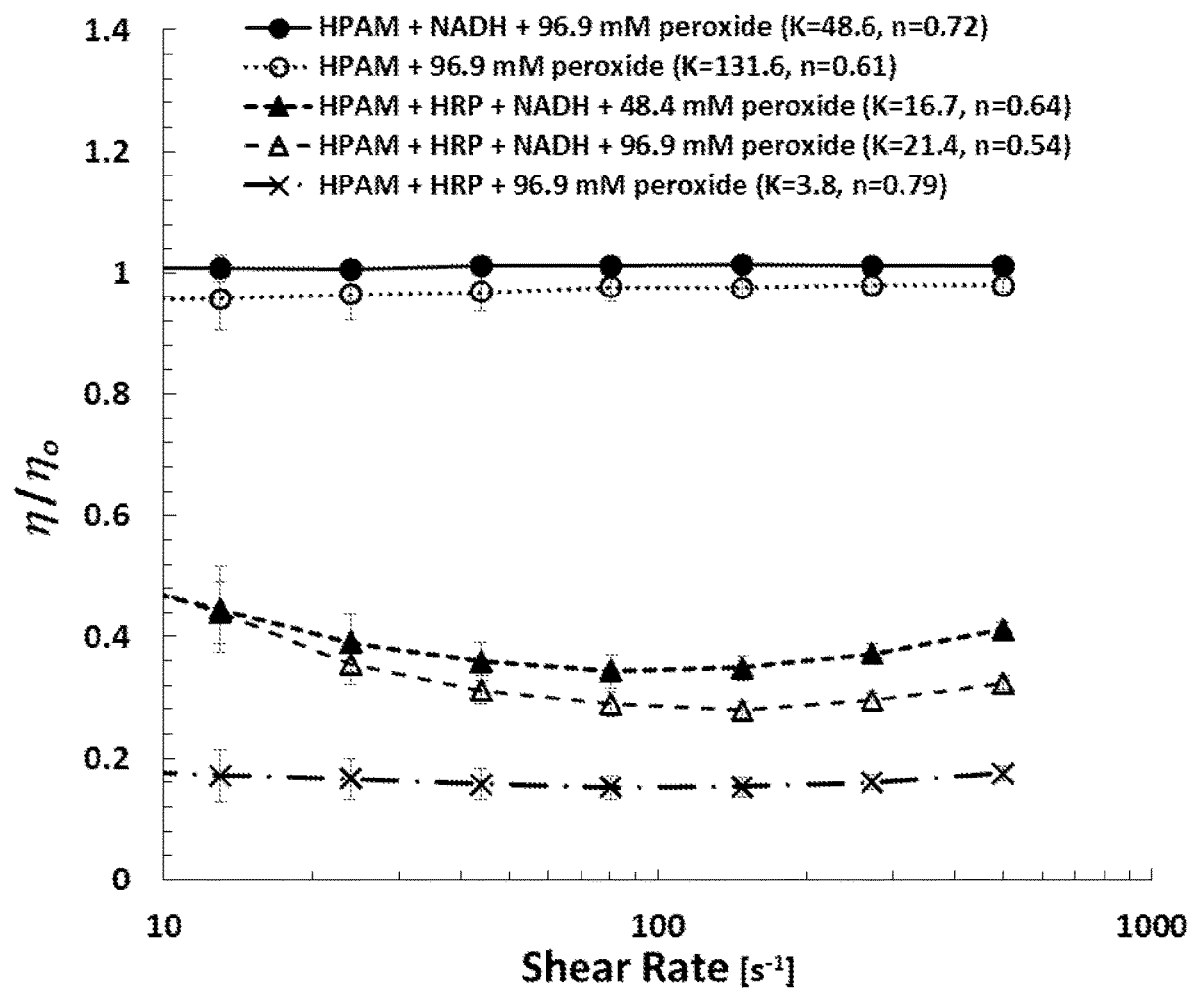
FIG. 2 is a plot illustrating the variation of viscosity ($\eta$) relative to the initial viscosity ($\eta_0$) at 25° C. with shear rate for 1980 ppm Alcoflood 935 samples containing varying peroxide concentration and the presence or absence of 45.0 µM HRP and/or 1.4 mM NADH after 24 hour incubation at 37° C. Power law constants K and n are representative of degraded HPAM trends; lines are smoothed data (n=3).

The addition of hydrogen peroxide ($H_2O_2$) alone with a 24-hour incubation induces very little effect degradation of HPAM as observed from the solution viscosity. FIG. 2 illustrates the change in viscosity relative to the initial solution viscosity at time zero ($\eta_0$) at each shear rate. As shown in FIG. 2, after a 24 hours incubation the fractional change in viscosity decreases only slightly (~2-4%). When the NADH is added along with $H_2O_2$, virtually no reduction was noted within 24 hours. Therefore without the enzyme, HRP, little to no degradation of HPAM (as evidenced through solution viscosity) was observed. As solutions with NADH and $H_2O_2$ experience virtually no background degradation, NADH was added to most of the model studies performed here so that the effect of the HRP without the small background degradation could be determined. However, studies comparing the degradation with and without NADH are included below and demonstrate that NADH would be potentially unnecessary in a practical application. For solutions containing HRP, the magnitude of the viscosity reduction is proportional to the amount of peroxide added to the solution. For mixtures with similar composition of HPAM, NADH, and HRP, increasing the concentration of peroxide results in increased degradation of HPAM as evidenced by lower viscosity after a 24-hour incubation. For instance at peroxide concentrations of 48.4 mM and 96.9 mM with NADH, the viscosity at a shear rate of 75 $s^{-1}$ was reduced by about 60% and 65% respectively. As shown, the fractional decrease does change somewhat with shear rate with larger differences in fractional decrease at relatively large and small rates. The power law index (n) for the same solutions show increased shear thinning characteristics with increased peroxide concentration at low shear rates. The effect of NADH as a moderator of polymer degradation as seen in the control experiments with peroxide is even more evident. At a peroxide concentration of 96.9 mM without NADH, the viscosity was reduced by about 81%. HPAM degradation under this condition showed similar rheological behavior as the unreacted sample (as noted by the relatively flat slope).

Figure 3:
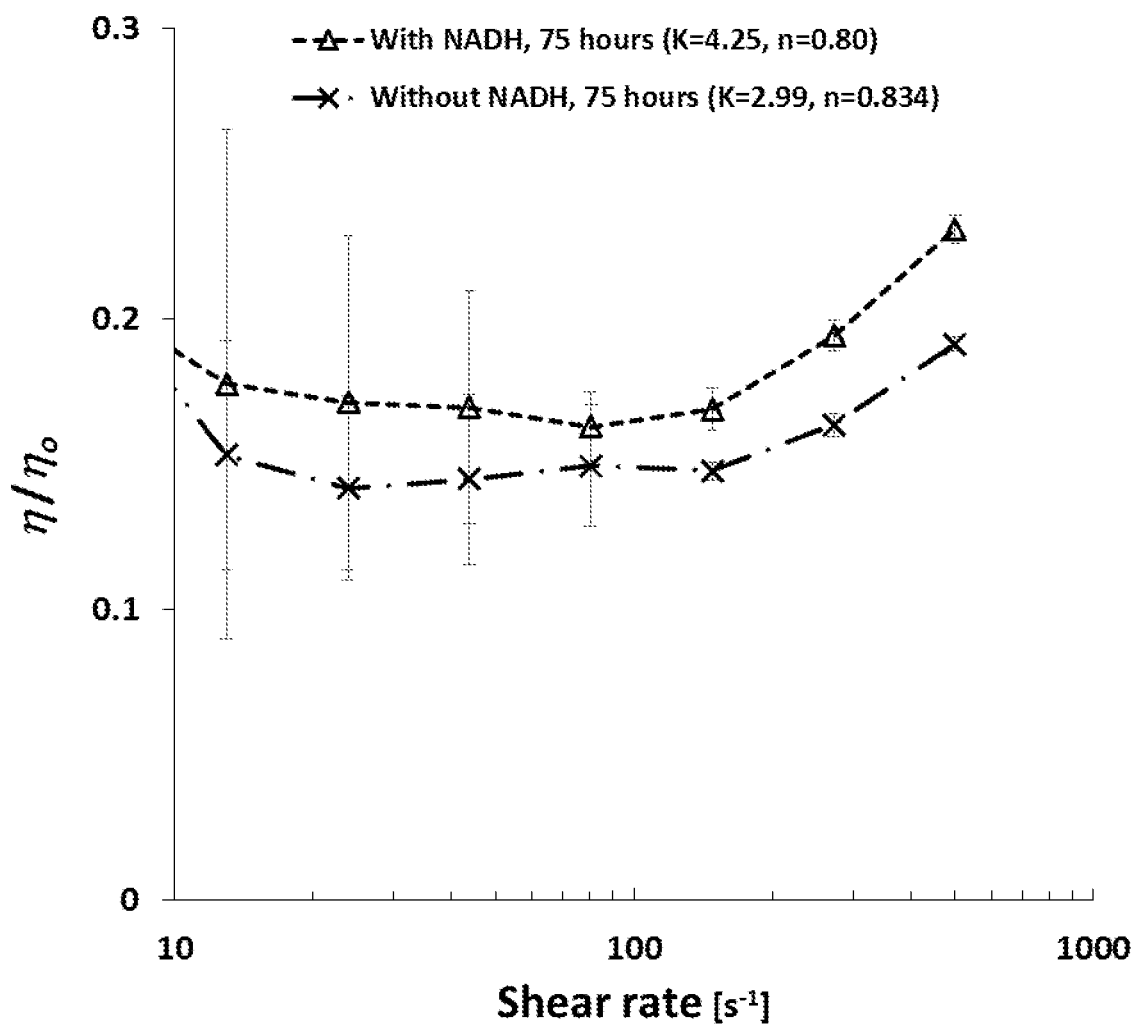
FIG. 3 is a plot illustrating the viscosity profiles for solutions containing 45.0 µM HRP in the presence or absence of 1.4 mM NADH. Samples were incubated for 75 hours at 37° C. and viscosity was measured at 25° C.; lines represent smoothed data (n=3).

As seen in the FIG. 2, a greater reduction in viscosity was observed for solutions containing 96.9 mM peroxide in the absence of NADH. In order to test whether NADH is delaying or inhibiting the viscosity reduction if HPAM, a separate study was conducted using equivalent concentrations to observe the reduction over an extended period. FIG. 3 shows the viscosity profiles obtained for those solutions containing 96.9 mM peroxide in the absence and presence of 1.4 mM NADH after 75 hours incubation at 37° C. The results show that a similar viscosity reduction was achieved regardless of NADH addition. Furthermore, the characteristic power law fit was similar for both samples regardless of NADH addition. From these findings, we can conclude that NADH suppresses the kinetic rate at which HRP can oxidize the polymer but yields similar effects at longer times. Similar time lags, or inhibition, have been reported for other systems with NADH.

Figure 4:
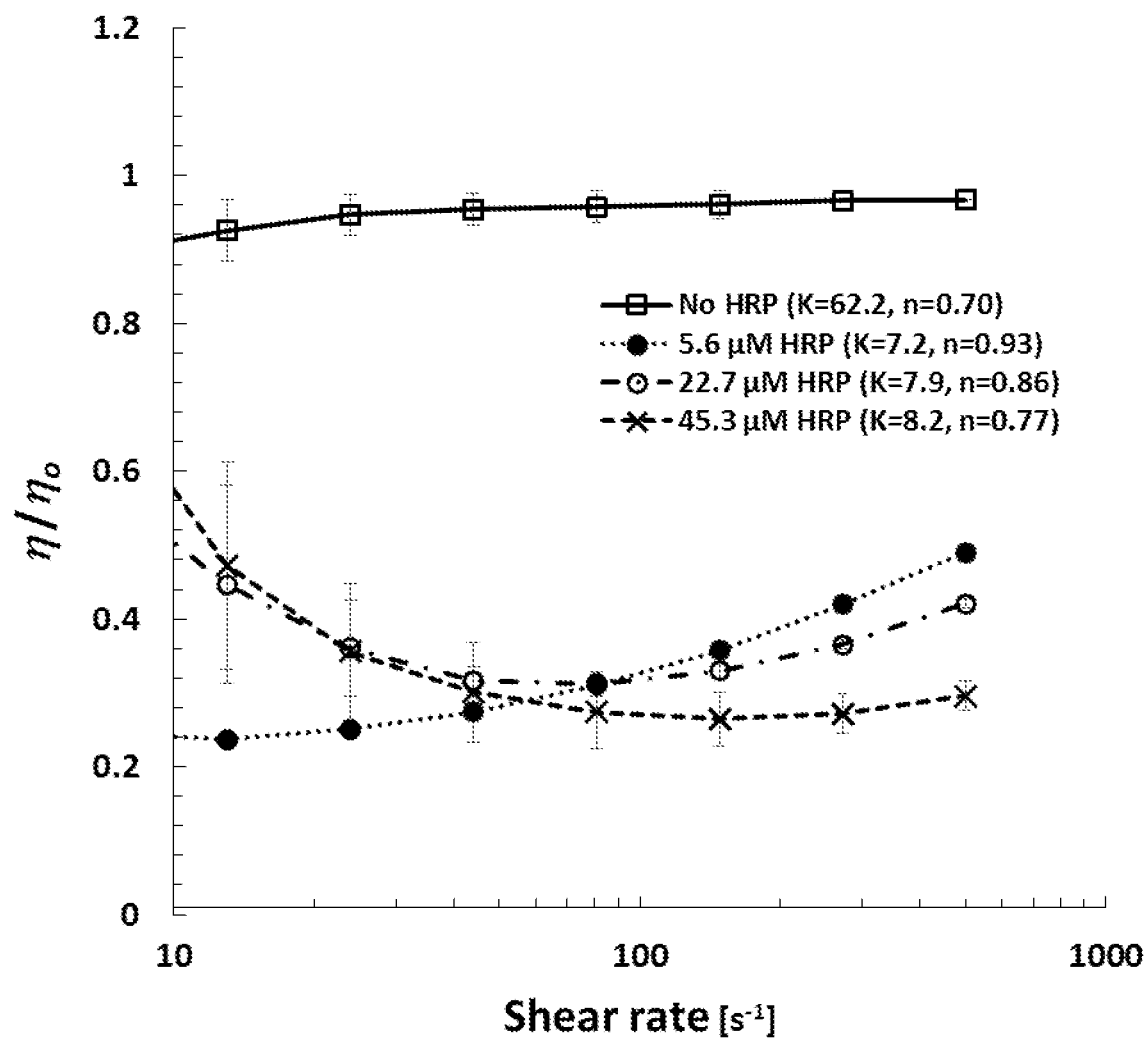
FIG. 4 is a plot illustrating the viscosity of HPAM/NADH solutions with varying HRP concentration relative to original polymer solution over the same range of shear rates. Solutions concentrations for peroxide and NADH are 96.9 mM and 1.40 mM respectively. Samples were incubated for 24 hours at 37° C.; lines represent smoothed data (n=3).

The amount of the horseradish peroxidase affects the rheology of the resulting solution after incubation. FIG. 4 illustrates the reduction in viscosity at different shear rates for three different concentrations of HRP. At an enzyme concentration of 5.6 µM, the viscosity reduction is approximately 75% at a shear rate of 10 s$^{-1}$ while at 500 s$^{-1}$ the reduction is only ~58%. Thus, a weaker shear thinning (n=0.93), almost Newtonian, solution remains after incubation. However, at an HRP enzyme concentration of 45.0 µM, a greater shear thinning solution results at low shear rates (n=0.77). While the average viscosity over all shear rates is similar for all HRP concentrations, the rheology can be different. The increase in shear thinning characteristic observed at low shear rates could indicate that that polymer chains are undergoing some recombination or hydrolysis but further studies are required to understand the reason for the emerging trend. The lower viscosity, and earlier onset of increased shear thinning behavior, suggests that the overall molar mass is being reduced but the final polymer products (after 24-hour exposure) contain some conformational side-chain differences. If the polymer backbone is systematically cleaved, and no branching occurs, then the solution would exhibit a lesser degree of shear thinning and a reduced viscosity as seen with the 5.6 µM HRP concentration in FIG. 4.

Degradation Kinetics from Viscosity and Molecular Weight:

The above studies were all conducted for a 24 hour treatment. In order to begin to obtain an understanding of the degradation over time, scouting studies were conducted for both the viscosity and molecular weight. Detailed micro-kinetic models of the decomposition of polymers often require knowledge of the mechanism of decomposition along with the molecular weight distribution at any time. A polymer may degrade with radicals by several different mechanisms starting with initiation, propagations (including hydrogen abstraction, chain scission, addition, etc.), and termination. Often, the initiation and termination steps are considered infrequent compared to the propagation steps. The scission steps may be either random or at certain points (e.g. chain-end scission). The type and frequency of scissions are currently unknown and would represent future study. However, some simplified kinetic approaches may allow at least some comparison between treatment conditions and their overall effect.

Figure 5:
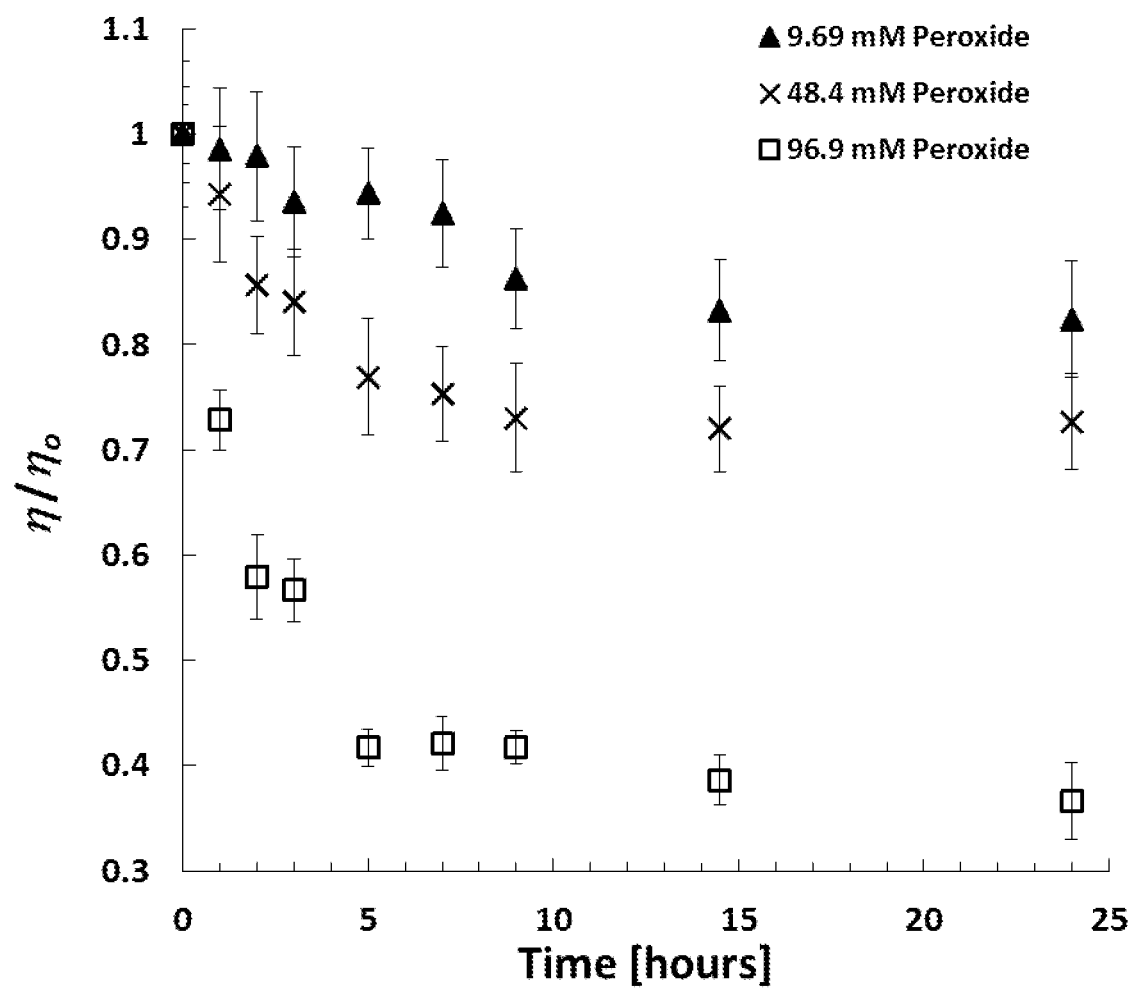
FIG. 5 is a plot illustrating the viscosity reduction of HRP/NADH/Alcoflood 935 solutions with varying peroxide concentration. (n=3, shear rate=75 s$^{-1}$, measurement at 25° C.).

The viscosity change with time was measured periodically over 24 hours at chosen shear rate of 75 s$^{-1}$ to represent an average viscosity. FIG. 5 shows the change in normalized viscosity (over the value at time=0) using 45.0 µM HRP and varying peroxide concentrations. Faster and greater reduction in viscosity is associated with increased peroxide concentration. The reduction in viscosity at long times is calculated as 17.6%±5.2, 37.7%±6.3, and 63.4%±3.9 for 9.69 mM, 48.4 mM, and 96.9 mM peroxide concentrations, respectively. To determine the approximate kinetic order of the concentration of H$_2$O$_2$, the initial rates (the most linear portion of the approximately first 3-5 hours) were compared to determine the relative magnitude of the exponent, a shown in Equation 2.

$$\frac{d\eta}{dt} \approx [H_2O_2]^a \qquad 2$$

The initial slopes, evaluated from the first 3-5 hours, and concentrations were directly proportional and resulted in a perfectly linear correlation (a=1 with R$^2$=0.97).

Figure 6:
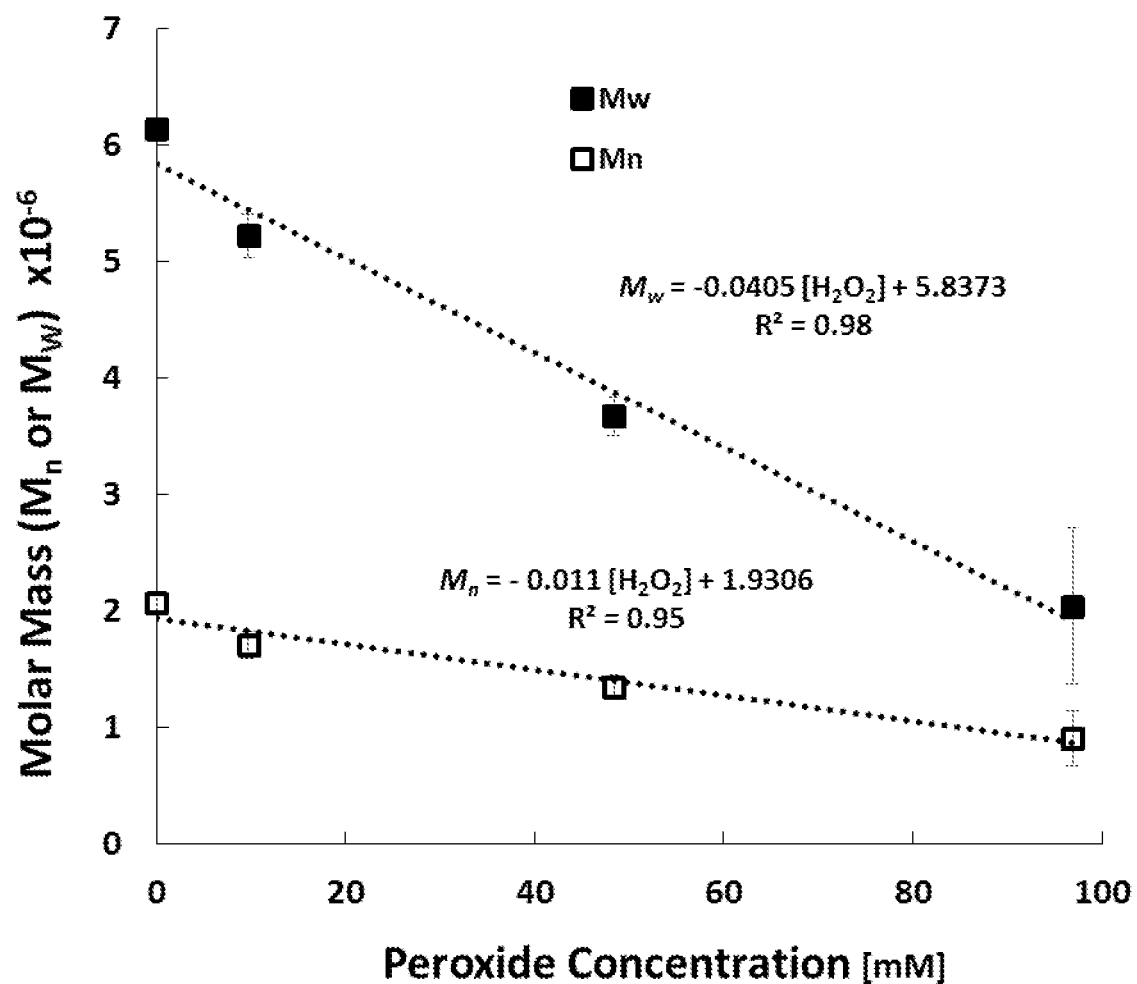
FIG. 6 is a plot illustrating the number average ($M_n$) and weight average ($M_w$) molecular weight reduction of Alcoflood 935 solutions with 1.4 mM NADH and 45.0 µM HRP in RO water with varying peroxide concentrations after 24 hour incubation; line represents smoothed data (n=3).

To verify that the changes in viscosity were due to reduction in molecular weight as opposed to rearrangement, hydrolysis, etc., studies were conducted using size exclusion chromatography (SEC). The weight average (M$_w$) and number average (M$_n$) molar masses were determined for the polymer after a 24 hour exposure to the HRP system at varying peroxide concentrations. Preliminary tests confirmed that there was a reduction in the molecular weight of HPAM after a 24-hour incubation period. These reductions in molecular rate cannot be due to hydrolysis of the remaining amide groups in HPAM (original polymer approximately 90% amide groups, 10% acrylate) (see position (1) in Scheme 1) as hydrolysis of the amide group to acrylate has approximately the same molecular weight. Moreover, polyacrylate with a similar degree of polymerization would produce solutions that actually increase in viscosity. It may be theoretically possibly that only the amide and/or carboxylate groups are cleaved in the degradation to produce some form of polyethylene with an approximately similar degree of polymerization and reduce MW, but this would be complete non-random scission of which there is no evidence. FIG. 6 illustrates the molecular weight reduction observed with varying concentration of peroxide. As inferred from the viscosity experiments, the reduction in molecular weight is peroxide dependent. The initial molecular weight was determined to be about 6.0×10$^6$ Da which corresponds well with the published value. The corresponding reductions in M$_w$ were 14.0%, 40.2%, and 66.8% for 9.69 mM, 48.4 mM, and 96.9 mM peroxide concentrations, respectively. The relative reductions in M$_n$ mimic those observed for M$_w$ and result in a more or less constant polydispersity (see FIG. 7 inset).

In addition, 24-hour degradation tests were conducted in 2% KCl brine to mimic fracturing fluid used for clay control (see supplemental data file). The reductions of M$_w$ in brine were 13.3%, 31.6%, and 62.3% for 9.69 mM, 48.4 mM, and 96.9 mM peroxide concentrations respectively, which are nearly identical to values obtained using RO water. Again, the reduction in M$_n$ followed M$_w$. Both water and brine experiments show a greater reduction in molecular weight as the peroxide concentration was increased. Furthermore, little change was observed when the reaction was conducted in a 2% KCl salt solution. The reductions in molecular weight agree well with the observed reduction in viscosity at a shear rate of 75 s$^{-1}$.

Figure 7:
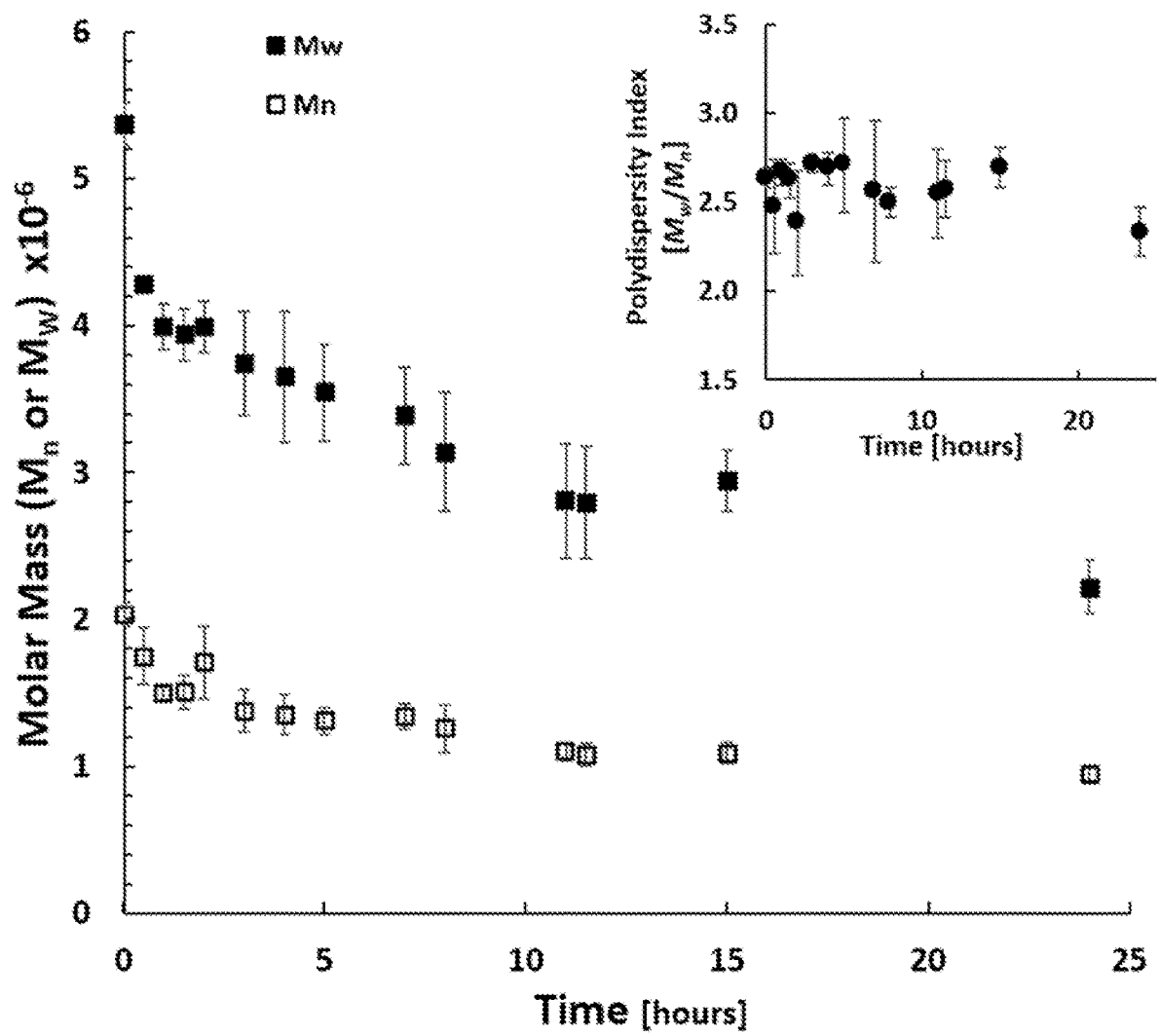
FIG. 7 is a plot illustrating the number average ($M_n$) and weight average ($M_w$) molecular weight reduction of Alcoflood 935 with respect to time for solution containing 1.4 mM NADH, 45.0 µM HRP, and 96.9 mM peroxide concentration. Inset shows corresponding polydispersity index (PDI); (n=3).

Periodic measurements of the molecular weight were made for the system containing 96.9 mM peroxide concentration in RO water (FIG. 7). As shown, both the M$_w$ and M$_n$ decrease over time with the largest reductions during the first 10 hours or so. During degradation, the polydispersity index decreased slightly from 2.64 to 2.34. The constant/slight decrease in polydispersity index suggests that the polymer backbone was cleaved randomly and under this mechanism will result in a constant polydispersity of about 2. For other degradation studies, a polydispersity of 2 has been confirmed for random chain scission of linear polymers using a Monte Carlo analysis method.

Figure 8:
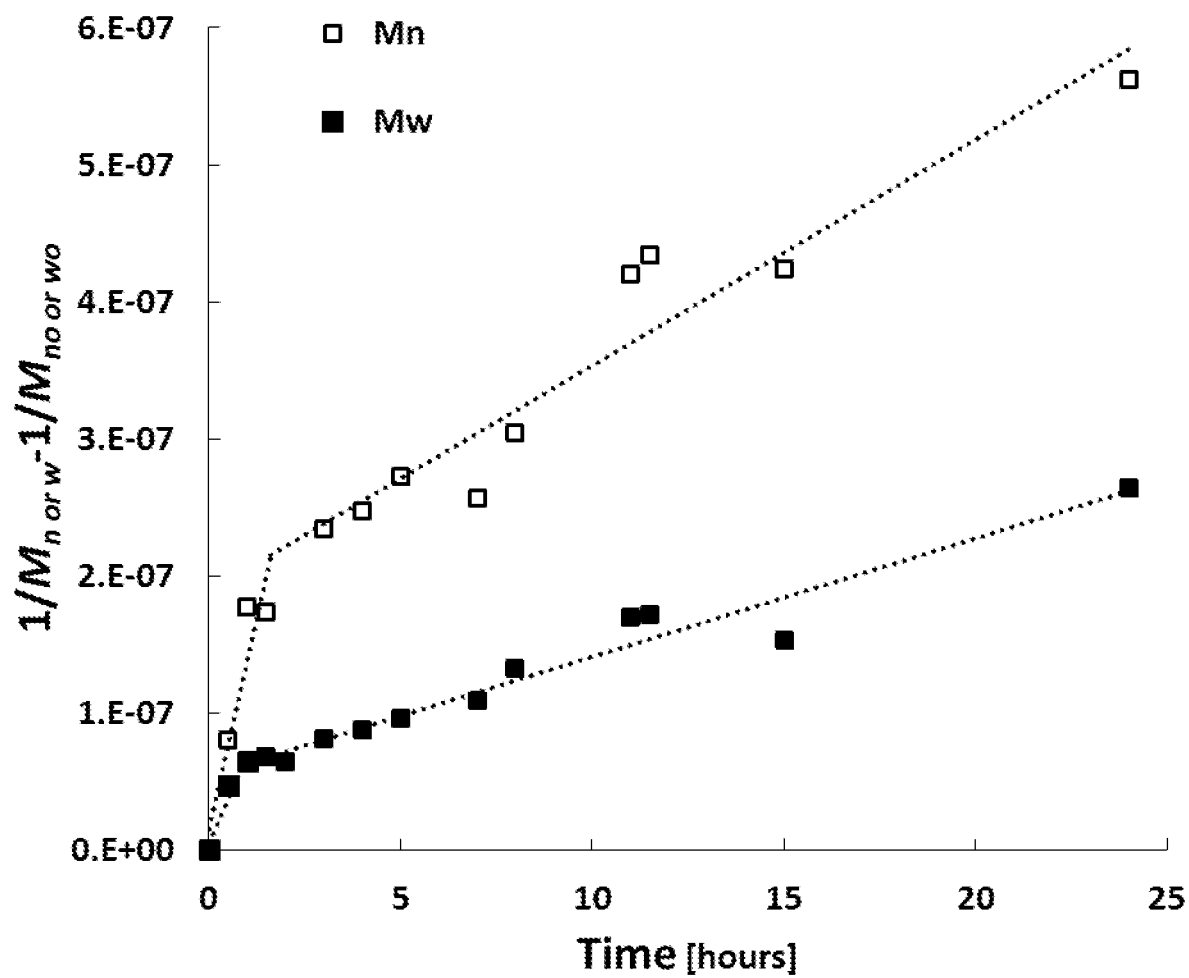
FIG. 8 is a plot illustrating the inverse molecular weight as a function of time (in hours) for 1.4 mM NADH, 45.0 µM HRP, and 96.9 mM peroxide concentration.

Conventionally in polymer degradation studies, the decrease in molecular weight (linkages of monomers) is often assumed as a first order process. Assuming a random molecular weight distribution and that the molecular weight of the polymer is much greater than the monomer, the kinetic expression becomes either:

$$\frac{1}{M_{w' \, or \, n'}} - \frac{1}{M_{w \, or \, n,o}} = \left(\frac{k_{t'}}{mN_0}\right)(t') = \hat{k}_{t'}(t') \quad 3$$

$$\frac{1}{M_{wt \, or \, nt}} - \frac{1}{M_{w' \, or \, n'}} = \left(\frac{k_t}{m}\right)(t - t') = \hat{k}_t(t - t') \quad 4$$

where m is the monomer molecular weight, $N_0$ is the total number of molecules and initial zero order kinetics proceed to time t' followed by first order kinetics up to time t. As shown in FIG. 8 when the inverse molecular weight is plotted versus time, two distinct slopes are observed in. The steep initial slope implies zeroth order kinetics followed by $1^{st}$ order for the remainder of the data. Equations 3 is used to obtain the zeroth order constant and Equations 4 is used to obtain the first order constant. The results are listed in Table 1. Similar qualitative results have been reported in a large number of polymer degradation studies for random chain hydrolysis of polymers using chemical and enzymatic reagents and catalysts. For example, the hydrolysis of alginate, cellulose linters, carrageenan, and glucomannan with chemical reagents or enzymes results in two distinct kinetic regions. Most studies do not state a reason behind the distinct regions; however, a distinct correlation between kinetic rate and polymer substrate concentration has been observed for the enzymatic degradation rate of guar. For example, low polymer substrate concentration created first order kinetics, intermediate concentrations showed zeroth order kinetics, and high concentrations were diffusion limited. However in this case, the initial polymer concentration does not change but the concentration of the other reagent, $H_2O_2$, changes continually throughout the reaction. Thus, $H_2O_2$ is a limiting reagent. In contrast, previous studies consisted of direct polymer/enzyme binding to facilitate degradation; technically hydrolysis studies also have a second reagent that is always in great excess: water. It should be reiterated that actual polymer degradation kinetics using peroxide and peroxidase enzymes is a culmination of a large number of elemental steps for $H_2O_2$, enzyme, radicals, polymers, etc. and therefore further investigation is needed to confirm reaction kinetics.

TABLE 1

Kinetic evaluation for data where $\hat{k}_{t'}$ is initial, apparent $zero^{th}$ order rate constant and $\hat{k}_t$ is the apparent first order rate constant.

| | $\hat{k}_{t'}$ [1/hr/g/mol] | $R^2$ | $\hat{k}_t$ [1/hr/g/mol] | $R^2$ |
|---|---|---|---|---|
| $M_w$ | $7.037 \times 10^{-7}$ | 0.920 | $8.642 \times 10^{-9}$ | 0.914 |
| $M_n$ | $1.743 \times 10^{-8}$ | 0.996 | $1.647 \times 10^{-8}$ | 0.948 |

Figure 9:
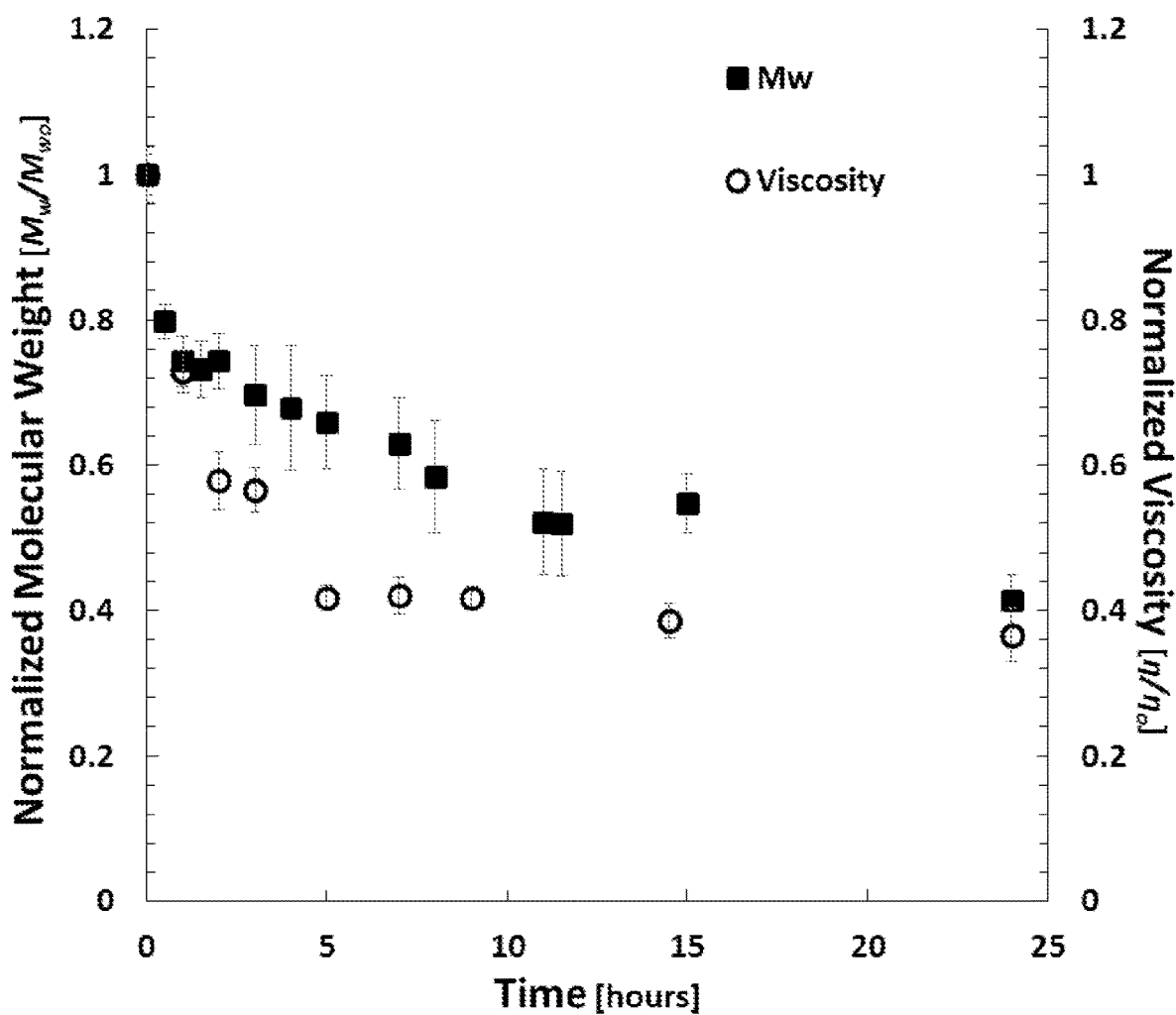
FIG. 9 is a plot showing the kinetics of fractional molecular weight change and viscosity change.
Figure 10:
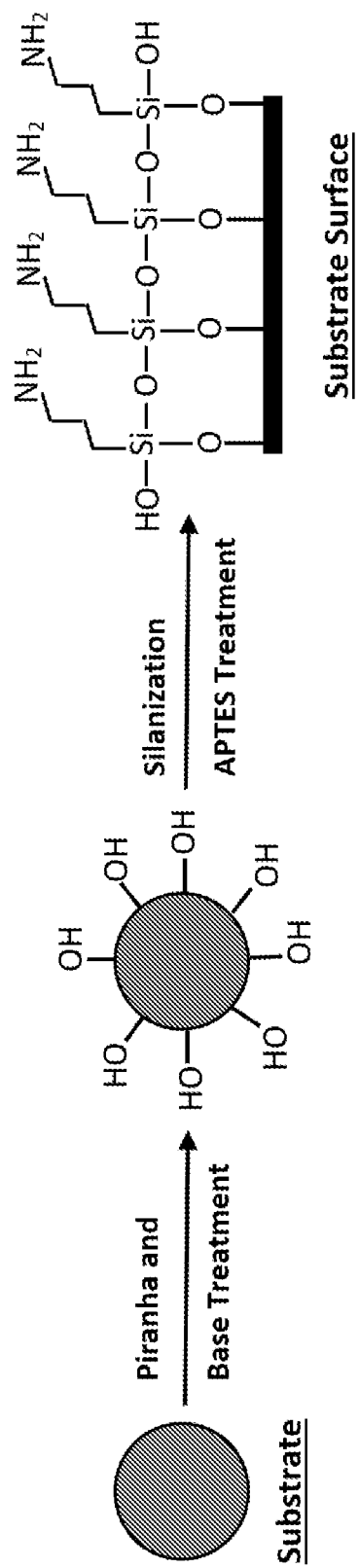
FIG. 10 illustrates the steps for silanization of glass and Ottawa sand surfaces.

As shown in FIG. 9, the fractional changes in viscosity and molecular weight with respect to their initial values are different at various times but proportional. As shown, a good linear correlation ($R^2 \geq 0.9$) between the two properties exists indicating that solution viscosity is a good indication of HPAM molecular weight reduction. The relationship between molecular weight and viscosity can be described by the following equation for times less than or equal to 24 hours: $M_w/M_{w0} = 0.795 \, (\eta/\eta_0) + 0.236$. Viscosity measurements are much more facile than the lengthier analytical techniques for molecular weight determination, i.e. SEC, etc. Thus as viscosity is proportional to molecular weight, viscosity measurements alone should allow more rapid development and engineering of these systems in the future followed by MW confirmation of only optimized systems.

Discussion of other PAM Degradation Methods from the Literature:

Persulfate oxidizers are the primary chemical breakers used during fracturing processes. The results from these studies with HRP and $H_2O_2$ are comparable with other chemical breaker systems in the literature with similar polymer and conditions. Amongst chemical breakers, potassium persulfate is more effective than ammonium persulfate, potassium persulfate-sodium-thiosulfate system, and hydrogen peroxide alone. In this study, little to no degradation was observed in the presence of hydrogen peroxide alone. At 0.4% PAM concentration, 40° C., and 30 mM potassium persulfate concentration the molecular weight of 12000 kDa PAM was reduced by about 35% after the first hour and a half. This fast initial reduction was followed by a slower degradation for PAM resulting in about 90% reduction after 10 hours of exposure. The viscosity of degraded solutions mimicked trends observed for the reduction in molecular weight. Reduction of PAM became more efficient with increased temperature, PAM concentration, and persulfate concentration. Although not shown, it can be assumed that the efficiency of potassium persulfate would decrease for the 0.2% PAM concentration used in this study. Although effective in the laboratory, the oil field application of persulfate breakers can create a number of issues. The non-specific nature of oxidative chemical breakers can react with well tubing, other reservoir fluid components, and show formation mineral incompatibility. Also, field studies with the carbohydrate polymer, guar gum, as the polymer have shown that guar specific enzyme breakers have been more successful than persulfates in actual oil filed application. However, these enzymes cannot degrade HPAMs like the current HRP/$H_2O_2$ system.

Fenton reagents are primary used for remediation of petroleum contamination in soils and fracturing wastewater treatment. The reduction in molecular weight observed using Fenton reagents is similar to that observed with persulfates but is significantly slower at low temperatures. The degradation of acrylamide, acrylic acid polymers, and copolymers has been observed in the presence of Fenton reagent at 30° C. Experimentally, the degradation was conducted in the presence of about 0.5% hydrogen peroxide, 0.247 mM Fenton reagent, and 5500 ppm (0.55% w/v) PAM with an initial molecular weight around 200 kDa . They showed that the molecular weight of PAM was reduced by 52% in 24 hours and further reduction of about 85% was observed after 120 hours. The results in this study show that polymer degradation using HRP is kinetically more rapid at lower temperatures than the use of Fenton reagents.

Conclusions

A biocatalytic system for the degradation of partially hydrolyzed poly(acrylamide) typically used in hydraulic fracturing fluids has been developed. Horseradish peroxidase catalyzes the radical degradation of the HPAM with hydrogen peroxide. $H_2O_2$ by itself has little effect on degradation and is eliminated in the presence of NADH. The viscosity and the rate of viscosity reduction of the polymer solutions were proportional to the amount of peroxide and HRP added. Similar molecular weight reductions were observed in both pure water and in a 2% KCl brine, indicating little interaction of the ions with either the enzyme or in the radical chemistry of the degradation. The reduction of viscosity was confirmed to be directly related to the decrease in the molecular weights of the solutions ($M_w$ and $M_n$). Simple kinetic modeling can connect the rate of changes in viscosity with that of molecular weight. Thus, the simpler viscosity studies could be used to develop and design future applications.

Example 2: Remediation of Polyacrylamide Permeability Damage using Free and Immobilized Peroxidase Enzyme and $H_2O_2$ Polyacrylamide polymers are ubiquitous in hydraulic fracturing fluids but often lead to the formation of a "filter cake damage" on the surface of the formation leading to lower oil or gas production. This study demonstrates that a more sustainable system, hydrogen peroxide and the enzyme catalyst Horseradish Peroxidase (HRP), has the ability to recover rock permeability when damaged with partially hydrolyzed polyacrylamide (HPAM). Preliminary results with polymer plugged nylon filters demonstrate some flowrate recovery with the $H_2O_2$/HRP system. Core flooding studies were conducted on low permeability (~1 md) Indiana Limestone and damage was partially remediated using free enzyme. In further development, HRP was immobilized to Ottawa fracturing sand (proppant) to place the catalyst in the immediate location of potential formation damage. The immobilized enzyme maintained the ability to degrade the polymer and enhanced permeability recovery in core flooding studies over a free enzyme treatment.

Introduction

Hydraulic fracturing is used in oil and gas production to increase production from tight or damaged reservoirs. Since the first reported fracturing conducted in 1947, many advancements have been made. One of the most important developments was the use of "slick water" treatments and hybrid crosslinked/slickwater fracturing. These fracturing techniques are utilized in unconventional low-permeability reservoirs, such as tight shale formations and differs from conventional fracturing in a couple of aspects. First, horizontal drilling is used and allows for increased wellbore contact with the production zone. Horizontal wells with laterals around 3000 m have been reported. The increased contact gives the ability to conduct multistage perforating, fracturing, and production through the extent of the lateral. However, the long horizontal extensions create significant fluid friction during fracturing and require the use of a friction-reducing polymer such as polyacrylamide (PAM) or, more often, partially hydrolyzed polyacrylamide (HPAM). The polymer solutions lower pumping work ("slick water") and allow the necessary flowrates to fracture the formation and to deliver proppant (quartz sand, ceramics, etc.) to the fissures to keep them open during relaxation of the pressure. The fracture fluid is mainly (>95%) composed of water and proppant with some minor additives such as biocide, scale inhibitors, etc. These minor additives are often targeted as the main potential environmental hazards of the water-based hydraulic fracturing methods. However, more benign alternatives are constantly being developed for these secondary purposes.

Proppants consist of silica sand, resin coated sand, or ceramic (or a combination of the three) and is intended to keep the fracture from closing after pressure is released. Proppant size and type are selected for the ability to maintain a highly conductive, productive channel for oil and gas production under the specific well conditions. In general, the fracture conductivity is determined by the proppant strength and uniformity with the strongest, most uniform proppant resulting in the highest production yields. Sand is the primary proppant used in the United States and accounts for around 90% of wells with total proppant consumption of 4.3 million pounds in 2013.

Friction reducers, such as HPAM, allow fluid and proppant to be delivered at high rates where the high fluid velocity is the main mechanism for delivering proppant into the fractures. Low flow rates would result in proppant settling out of suspension before being delivered to the newly created fissure. An undesired consequence of using a friction reducer is the deposition of the polymer on the surface of geologic formation. As the polymer solution tries to permeate through the rock, the small pores plug and a "filter cake" is formed on every exposed surface. The use of PAM and HPAM for proppant transport and friction reduction are known to create formation and fracture damage. Here, "damage" implies substantially decreased permeability of oil or gas and lowered production rates. Because of the damage created, the polymer must be degraded using breakers to take advantage of the increased surface area provided by the fractures. PAM and HPAM polymers contain carbon-carbon (C-C) backbones and are stable at temperatures as high as 200° C. making degradation especially difficult even with oxidizing "breakers." A majority of prior research has focused on degradation using harsh oxidative, chemical breakers with little focus on more sustainable and environmentally conscious alternatives.

Enzymes are naturally derived protein catalysts that reduce the activation energy of a specific reaction. The high specificity, and very low environmental impact make enzymes a practical and attractive alternative to chemical applications in industry. Hydrogen peroxide ($H_2O_2$) is considered one of the more sustainable ("green") and least expensive liquid oxidants.

However, $H_2O_2$ without a catalyst has little ability to degrade polymers, such as HPAM. In Example 1, we demonstrated that the enzyme horseradish peroxidase (HRP) successfully catalyzed the reduction in viscosity and molar mass of high molecular weight, partially hydrolyzed polyacrylamide (HPAM) in aqueous and 2% KCl brine solutions. The peroxidase enzyme is capable of producing chemical radicals from peroxides that can degrade even recalcitrant polymers with C—C backbones such as HPAM. Without the enzyme catalyst, little to no degradation occurs with $H_2O_2$ alone. The primary goal of this study is to demonstrate the proof-of-concept that HRP and $H_2O_2$ can successfully recover permeability damage created by HPAM in low permeability rock. Initial studies focus on the use of free enzyme to recover permeability of synthetic filters and then actual rock core samples. Immobilizing the enzyme to the proppant holds a number of potential advantages for remediation especially in holding the catalyst where it is needed the most: right near the polymer damage.

Background

Polyacrylamide Degradation

Degradation of PAM can take place via changes in the polymer side chain or by backbone cleavage with the latter being more difficult. The hydrolysis of PAM can be conducted under highly elevated temperature, acidic or alkaline conditions using a variety of additives. However, simple hydrolysis of amide groups of PAM to poly(acrylic acid) [polyacrylate] would actually worsen the situation as it increases the viscosity of the polymer solution. In order to reduce the viscosity and molecular weight, carbon backbone cleavage must occur which can be achieved through oxidation and/or the production of free radicals. Chemical oxidizers, such as Fenton reagents and persulfates can cleave the C—C backbone of PAM by free radical attack. Studies have demonstrated carbon backbone cleavage of PAM using Fenton reagent and $Fe^{2+}$. Potassium persulfate is one of the most widely used oxidizing breaker. Some viscosity and molecular weight reduction of PAM has been observed in the presence of persulfates, but little reduction has been observed using hydrogen peroxide alone. The reduction in apparent viscosity of friction reducer (HPAM) was demonstrated using commercial persulfate oxidizers in both fresh water and brine based solutions and all were successful at 82° C. Potassium persulfate has also been shown to recover permeability loss from PAM in Ohio sandstone at 67° C.

Horseradish Peroxidase

Horseradish peroxidase (HRP) is an oxidative enzyme with an iron porphyrin (heme) appendage in its active cite that catalyzes a number of chemistries using peroxides as reagents. As with chemical breakers, HRP produces radial intermediates that have the ability to degrade polymers. The cycle balance reactions is:

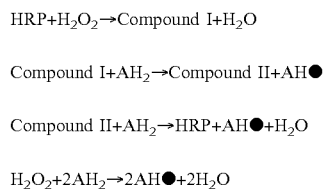

$$HRP+H_2O_2 \rightarrow \text{Compound I} + H_2O \quad\quad 5$$

$$\text{Compound I} + AH_2 \rightarrow \text{Compound II} + AH\bullet \quad\quad 6$$

$$\text{Compound II} + AH_2 \rightarrow HRP + AH\bullet + H_2O \quad\quad 7$$

$$H_2O_2 + 2AH_2 \rightarrow 2AH\bullet + 2H_2O \quad\quad 8$$

The reaction is initiated by the decomposition of one molecule of hydrogen peroxide to produce the active form of HRP called Compound I. Compound I forms when the iron in the heme group in HRP transforms from a Fe(III) to a radical cationic Fe=O (IV). A reductant ($AH_2$) (here the target compound) then reacts with Compound I forming a radical species and the Compound I form of HRP becomes the Compound II form. Compound II can then react with another reductant and returns to the native form of HRP, which can then reenter the cycle with another molecule of $H_2O_2$. The radicals can then leave the active site and readily react with other $AH_2$ molecules propagating the degradation. In other applications in environmental remediation, pollutants such as phenol and phenol-like compounds can act as the reductant and are directly reduced by HRP forming polyphenols which precipitate out of solution. Furthermore, the addition of nicotinamide adenine dinucleotide (NADH) as a reductant can generate hydroxyl, superoxide, and NAD● radicals that have been shown to facilitate polysaccharide degradation. Hydrogen peroxide can act the oxidant and reducing substrate in the absence of a primary reductant. In this cycle, Compounds I and II are reduced by hydrogen peroxide to produce two $HO_2\bullet$ radicals. The addition of a reductant can protect against HRP inactivation observed with the HRP/peroxide system alone.

Enzyme Immobilization

Covalently binding the enzyme to a solid substrate can help separate the enzyme from solution in addition to potential activity stabilization. However, this has not yet been attempted for hydraulic fracturing applications. For these studies, immobilization could also prevent the HRP from participating in formation pore flooding as well as the polymer; although this is a minor concern. Immobilizing HRP has been of particular interest in biotechnology and biomedical applications. HRP can be immobilized on a variety of other substrates such as graphene oxide, carbon nanotubes, gold surfaces, indium tin oxide, polymer coated beads, chitosan, and can be entrapped in a variety a matrices.

For the purpose of this Example, the covalent bonding of HRP on glass or silica substrates will be reviewed. For covalent immobilization of the enzyme to a glass or silica, the surface can be modified using a bifunctional silane molecule that can react with silica on one end and another functional group to cross-link with the protein, e.g. amine, mercapto, etc. After surface modification, a hetero or homo bifunctional cross linker is applied to covalently attach the protein to the surface modified substrate. In many immobilization studies, a decrease in activity is observed in immobilized samples and can be attributed to active site hindrance or protein unfolding and conformational changes the degree of which is dependent upon functional group. Glutaraldehyde as a cross linker is reactive toward amine groups found in aminosilanes and lysine residues in the protein. Native HRP contains six lysine groups available for binding, and studies using (3-Aminopropyl) triethoxysilane (APTES)-glutaraldehyde binding technique have shown good results for other applications.

Very little research has been done on enzyme immobilization using quartz sand. The lower concentration of available binding sites on sand is expected to result in lower immobilized enzyme concentrations when compared to glass and other substrates. However, the immobilization of enzyme catalysts on proppant particles should beneficially allow regio-specific deposition of an enzyme catalyst in the areas of greatest need: in the fissures nearest fracking polymer damage.

Materials and Methods

HPAM and Enzyme Solutions

Partially hydrolyzed polyacrylamide (HPAM; $M_w$=6,000 kDa) AlcoFlood 935, Lot A2247BOV was obtained from Ciba Specialty Chemicals. Alcoflood 935 was added to room temperature 18 MΩ, reverse-osmosis water (LabconcoWaterPro RO/PS system) or 2% (2.0 g/L) Potassium Chloride (Fisher Scientific). For all experiments, HPAM concentration was 2000 ppm (2 mg/ml). Polymer solution was stirred slowly for approximately 12 hours to ensure complete dissolution and vacuum filtered prior to use through an 8 μm filter paper (Micron Separations Inc.) to remove any undissolved polymer aggregates. The enzyme system consisted of horseradish peroxidase Type II (HRP; $M_w$=44,000), essentially salt-free, lyophilized powder, 150-250 units/mg solid (using pyrogallol standard) (Sigma) and β-nicotinamide adenine dinucleotide (NADH) (Sigma-Aldrich). Experiments using free enzyme in solution (i.e filtration and core flooding) were made to a concentration of 45.0 μM. If present, a concentration of 1.40 mM NADH was used and enzyme reactions were activated by the addition of a 96.9 mM hydrogen peroxide concentration diluted from a 30% concentration (Fisher Scientific).

Recovering HPAM Damage of Synthetic Filters

Tests were conducted using the apparatus shown and described in the supplemental file. All PVC tubing and fittings were purchased from McMaster Carr (Elmhurst, Ill.). In summary, 0.125 inch tubing was used apply air pressure to 0.5 in outer diameter (OD) clear PVC reservoir. The apparatus used a variety of components to convert from PVC to 0.125 inch tubing. Swagelok (Solon, Ohio) was used to convert from National Pipe Thread Taper (NPT) to tubing. The outlet side of the reservoir is connected to an Advantec 47mm polypropylene filter holder (Advantec MFS Inc, Dublin, Calif.) and 0.1 μm Magna filters (47 mm, nylon, Fisher) were used for filtration. A PVC valve is located under the filter holder for fluid shutoff and effluent mass was measured using A&D HF-2000G scale (San Jose, Calif.). For all stages of filtration, a constant pressure of 20 psig was applied to the system. Different combinations of system components were used to create the filter cake and the treatment solutions were varied (Table 2). Solution concentrations were the same as those used in previous viscosity and molecular weight experiments and were comprised of 2000 ppm Alcoflood 935, 45.0 µM HRP, 1.4 mM NADH, and 96.9 mM hydrogen peroxide in water. Data was recorded using Lab VIEW software (National Instruments, Austin, Tex.)). All flow rate measurements were conducted with water and no air was allowed into the system after initial saturation of the filter paper.

TABLE 2

Description of components used to create filter cake and applied treatment.

| Expt # | Filter cake formation | 24 hour treatment |
|---|---|---|
| 1 | HPAM | Peroxide |
| 2 | HPAM | Peroxide + HRP |
| 3 | HPAM | HRP + NADH + Peroxide |
| 4 | HPAM + HRP | Peroxide |
| 5 | HPAM + HRP | NADH + Peroxide |
| 6 | HPAM + HRP + NADH | Peroxide |

Data was collected for the mass of effluent water with respect to time for initially undamaged ($Q_i$), damaged ($Q_d$), and recovered ($Q_r$) flow rates. A positive pressure of 20 psig air was applied above the filter solutions. Filter damage ($Q_d$>99%) was created using 10 ml of 2000 ppm HPAM. After damage, treatment solutions (10 ml) were applied to the reservoir and 2 ml was flushed through the filter to ensure contact with filter. After 24 hours at room temperature, the excess treatment solution was carefully removed without disturbing the filter surface and the recovered flowrate to water was measured. Percent damage and recoveries were calculated using Equations 5 and 6. Filter cake formation and treatment solutions were composed of different system components as shown in Table 2. Each data set consist of a three or more samples and error is reported as standard deviation from the mean.

$$\% \text{ Damage} = (Q_i - Q_d)/Q_i * 100 \qquad 5$$

$$\% \text{ Recovery} = (Q_r - Q_d)/Q_i * 100 \qquad 6$$

Several control studies were performed. A filter was damaged by flowing 10 ml polymer solution and applying 10 ml water is used in place of amount of treatment solution. The cake set for 24 hours then the excess water was carefully removed and the change in flowrate to water was compared to the initial flowrate using Equation 6. To observe the effect of peroxide on the filter and filtration system, 10 ml of 96.9 mM peroxide was added to the filtration system in the absence of HPAM. The treatment set for 24 hours and the flowrate to water was compared to the initial flowrate.

Enzyme Immobilization

Enzyme was immobilized on F-110 Ottawa sand (US Silica, Fredrick, Md.). Base, acid, toluene, used for sand treatment was purchased from Fisher Scientific. Silanization was conducted using (3-Aminopropyl) triethoxysilane (APTES, 99%, Sigma-Aldrich). Cleaning the sand surface was conducted by first subjecting substrates to a hydroxylating piranha etch, 3:1 $H_2SO_4$:30% $H_2O_2$ at in a beaker at 80° C. for 1 hour followed by 5:1:1 $H_2O$:$NH_4OH$:30% $H_2O_2$ under sonication for a minimum of 1 hour. The amine containing compound (3-Aminopropyl) triethoxysilane (APTES), was then attached by submersing 20 grams in 5% APTES in anhydrous toluene for 4 hours at room temperature. After APTES treatment, the sand/glass was washed with toluene, acetone, and air-dried. APTES treated sand was stored and used as needed. Glutaraldehyde cross linker was used to bridge the $NH_2$ groups on the glass and amino acids in HRP. Sand and glass was treated with 2.5 wt. percent glutaraldehyde (50 wt. percent in water, Sigma) in 50 mM Phosphate buffered saline (PBS, pH=7.4, Fluka) under agitation at room temperature for 1 hour. Excess glutaraldehyde was removed by 50 mM PBS (pH=7.4). A volume of 5 ml, 113.3 µM (5 mg/ml) HRP was added per gram activated sand and agitated for 24 hours at 4° C.

Immobilized concentration and activity measurements were conducted using Cary 300 Bio UV-Vis spectrophotometer (Varian, Palo Alto, Calif.). The amount of immobilized HRP was determined by a mass balance monitoring the HRP concentration change in the supernatant (removed from sand after enzyme exposure) with the remainder considered immobilized. Control and supernatant were diluted (5 mg/ml initial concertation) by 1:5 then measured spectrophotometrically at an absorbance at 405 nm. Solution concentrations were determined from a Beer's law calibration curve constructed using the same enzyme batch. The activity of the same control, supernatant, and immobilized enzyme was measured using Pyrogallol (99% ACS reagent, Sigma-Aldrich) at a wavelength of 420 nm while stirred. The activity of the peroxidase is defined by the common pyrogallol method. One unit of activity of peroxidase will form 1.0 milligram of purpurogallin from pyrogallol in 20 seconds at pH 6.0 at 20° C. This purpurogallin unit is equivalent to ~18 µM units per minute at 25° C. Using this method the volume ($V_t$) was 3 ml, Extinction coefficient ($\varepsilon$) is 12 $(mM\text{-}cm)^{-1}$ for 1 mg/ml Purpurgallan at 420 nm, the dilution factor (DF) is 625, and volume enzyme ($V_e$) is 0.10 ml. The activity assay protocol was modified slightly to accommodate the use of immobilized enzyme. Solutions were made up to the concentrations used for the blank sample and all components but peroxide were placed in the cuvette. Before addition of peroxide, 10 mg of HRP treated sand was added to the assay mixture. The cuvette was placed in the spectrophotometer, temperature was allowed to equilibrate, and then peroxide was then added to activate the assay while mixed. Blank samples used the addition of 100 mM PBS in place of peroxide. Equation 7 represents the modified activity equation used to calculate the specific activity. The activity is a function of the absorbance, total assay volume ($V_t$), extinction coefficient ($\varepsilon$), and mass of sand ($M_s$).

$$\frac{\text{Units}}{\text{mg Sand}} = \frac{\left(\left(\frac{\Delta A_{420}}{20 \text{ sec}}\right)\text{test} - \left(\frac{\Delta A_{420}}{20 \text{ sec}}\right)\text{blank}\right) * Vt}{\varepsilon * Ms} \qquad 7$$

HPAM Viscosity Reduction

The reduction of HPAM solution viscosity was tested using immobilized enzyme samples. The immobilized enzyme sample contained 0.5 g of HRP treated sand. All samples contained 1.4 mM NADH and 96.9 mM hydrogen peroxide in 2000 ppm Alcoflood 935 (in water) stock solution. Procedurally, the polymer and NADH mixture was added to the sand-containing enzyme in a 4:1 volume solution: weight sand ratio. The free enzyme sample contained 0.5 g of untreated Ottawa sand as a control. Solutions were prepared as stated above but 0.516 mg of HRP was added to the sample. This amount of HRP was calculated from the previous concentrations studies that showed there was 1.032 mg HRP immobilized/gram sand. A negative control, with no HRP, contained 0.5 g of untreated Ottawa sand and peroxide. The reactions were activated by addition of 10 µl/ml 30% peroxide (96.9 mM final concentration) before the first viscosity measurement. Measured volumes were placed back into reaction vials as to not change the enzyme concentration.

Core Encapsulation and Flooding

Indiana Limestone was purchased from Kocurek Industries INC (Caldwell, Tex.). Cores were cut to 1 inch diameter, 0.7 inch length and encapsulated in schedule 80 clear PVC (1 inch length and 1.5 outer diameter, McMaster Carr). Encapsulation was conducted in a plastic mold (made in house) with molding clay (Hasbro, Pawtucket, R.I.). In the center of the plastic mold, a 0.125-inch cutout provided a place to put the clay, which sealed one end of the core during resin application. To prevent pore space envision by thinner resin, a thin layer of Easypoxy K-2 repair kit (Cytec Solvay Group, Woodland Park, N.J.) was placed around the cores and allowed to cure. The pre-treated core was pressed into the molding compound and the PVC is centered on the core. The annulus between the core and PVC is filled with Armstrong C-4 resin and D activator (Easton, Mass.) at a ratio of 4:1. The core was allowed to cure in the mold for 24 hours then removed and sanded flush where core was in contact with molding compound. Immediately before the core was used for flooding, the pore volume and porosity were quantified using Equation 8 by measuring the mass of the core before and after vaccum saturation.

During core flooding, an Isco 260D-syringe pump (Teledyne Isco, Lincoln Nebr.) and Eldex pump (Eldex Laboratories, Inc, Napa, Calif., max 5 ml/min) were used in parallel to deliver enzyme and peroxide solutions separately. The Isco pump was used to measure brine permeability (Equation 9) and deliver enzyme/NADH solutions for damage treatment. During treatment stage, the Isco pump was loaded with a solution consisting of 12 ml HRP and NADH at concentrations of 90.6 µM and 2.8 mM in 2% KCl brine respectively. A peroxide solution made in 2% KCl brine at a concentration of 193.8 mM by addition of 20 µL, 30% peroxide per ml brine was delivered using the Eldex pump. The inline mixer, placed before core holder, ensured treatment mixing. Two Validyne pressure sensors (Validyne Engineering, Northridge, Calif.) were used with max pressures of 50 and 500 psia for accurate reading over low and high ranges. Experiments were conducted at a flow rate of 0.2 ml/min and atmospheric pressure. Treatment solutions were applied for 24 hours at 30° C.

Figure 11:
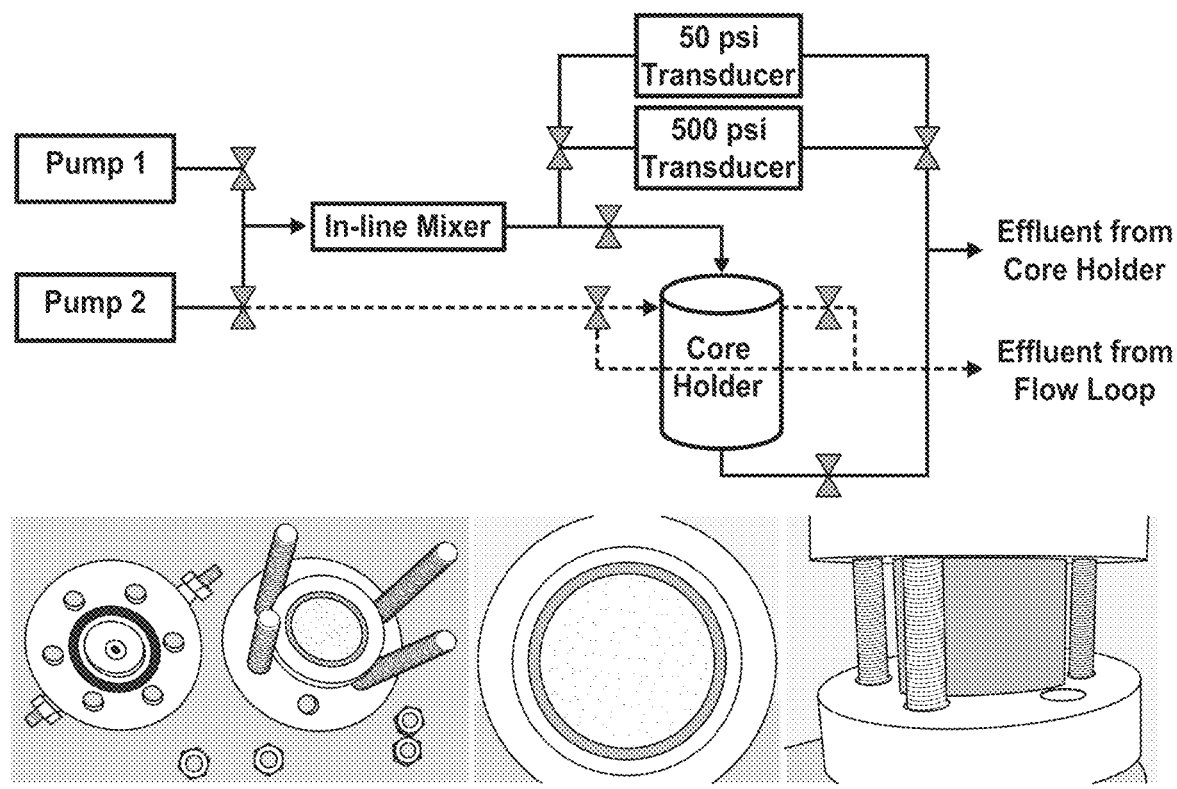
FIG. 11 shows a schematic of the entire core flooding apparatus (top) along with pictures of the core holder with aluminum/epoxy encapsulated core (bottom left), the PVC and epoxy encapsulated core (bottom middle), and the encapsulated core in the core holder (bottom right). Application of the enzyme treatment to the core is also visible (notice the solution visible on the top of the core).

The core holder was made in house. FIG. 11 shows the disassembled core holder (bottom left), the final PVC encapsulated core (bottom center), and the assembled core holder (bottom right). The free space above the core was about 10 ml. The top of the core holder contained two ports positioned across from one another. One port was used to create brine cross flow for air evacuation and the port opposite for effluent waste. The orientation of the core holder allowed fluid to enter the top and fill the headspace. The core were placed into the flooding apparatus and air in the headspace was evacuated with 2% KCl brine.

Permeability recovery, using HRP treatment, was tested by comparing the values measured for undamaged, HPAM damaged, and HRP treated core samples. After determining undamaged permeability, a one ml slug of 2000 ppm Alcoflood 935 was then injected at a flowrate of 0.2 ml/min followed by brine injected at the same flowrate until the pressure stabilized 1-2 hours) at which time the damaged permeability was determined. The 10 ml headspace above the core was filled with air, by displacing residual brine through the core, using the Isco pump at the pressure observed during damaged permeability measurement. Careful observation was used to ensure that no air was injected into the core. After the headspace was filled with air, the effluent valve (downstream side of core) was shut and 24 ml enzyme treatment was applied by venting the top of the core and filling the headspace at a combined pump flowrate of 2 ml/min (1.0 ml/min for each pump). The excess reaction solution was circulated through the headspace to ensure target treatment concentration. The treatment solution was incubated on top of the core at 30° C. for 24 hours and at atmospheric pressure. Before measuring the recovered permeability, brine was circulated through the top of the headspace (using the flow loop) to evacuate air and oxygen created above the core during the reaction. Recovered permeability was determined after 15-hour brine flush at 0.2 ml/min to obtain a stable pressure. Due to degraded polymer movement through the core an extended (15-hour) flush ensured that a steady state pressure reading was achieved for analysis.

As with the filtration experiments, various components were tested to quantify individual contribution to permeability recovery. Experiments quantified the permeability recovery with treatment by the full HRP, NADH, and peroxide system using free and immobilized enzyme. With immobilized HRP, one-gram enzyme treated sand was added to the top of the core after the damage permeability was measured. For sand application, the top of the core holder was removed and 1 g of HRP immobilized sand was added to the top of the core. The core holder was reassembled and the NADH/peroxide treatment was added. All other procedures were followed as previously stated. Additional tests were conducted to observed permeability change in damaged cores attributed to the 15 hour flush, HRP and NADH exposure (without peroxide), peroxide alone, and effects of the reaction on the rock without damage.

$$\text{Porosity } (\Phi) = \frac{\frac{\text{saturated weight} - \text{dry weight}}{\text{brine density}}}{\text{bulk volume}} = \frac{\text{pore volume}}{\text{bulk volume}} \qquad 8$$

$$K = \frac{Q\mu L}{\Delta P A} \qquad 9$$

Results and Discussion

The objective of this study is to evaluate hydrogen peroxide and a peroxidase catalyst's ability to recover damage created by HPAM flooding when applied to porous media. Flow recovery was measured using synthetic filters and geologic core flooding tests where flow characteristics were measured in only the forward flow direction. It should be noted that measurements of unidirectional flow with different treatments is a conservative/rigorous evaluation method since increased permeability of oil and/or gas in the reverse direction is the desired goal. However, the unidirectional flow of water/brine will serve as a stringent proxy in evaluating the current method and allow more fundamental calculations of the sizes of pore and polymer layer, etc. Studies with HPAM plugging of synthetic filters were initially evaluated to test the treatment system. Core flooding studies were conducted to measure the recovered permeability of HPAM damaged Indiana Limestone using both free and immobilized HRP. HRP immobilization was conducted on Ottawa sand and the immobilized concentration and activity were characterized. In addition, HPAM viscosity reduction was measured using free and immobilized HRP. The enzyme-immobilized sand was then used in core flooding studies to observe permeability recovery in HPAM damaged cores. The final section constitutes a theoretical analysis derived from enhanced oil recovery to determine and explain the macro phenomena in terms of the average pore radius and polymer layer thickness before and after treatments given the experimental data.

Evaluation of HPAM Damage of Synthetic Filters

Figure 12:
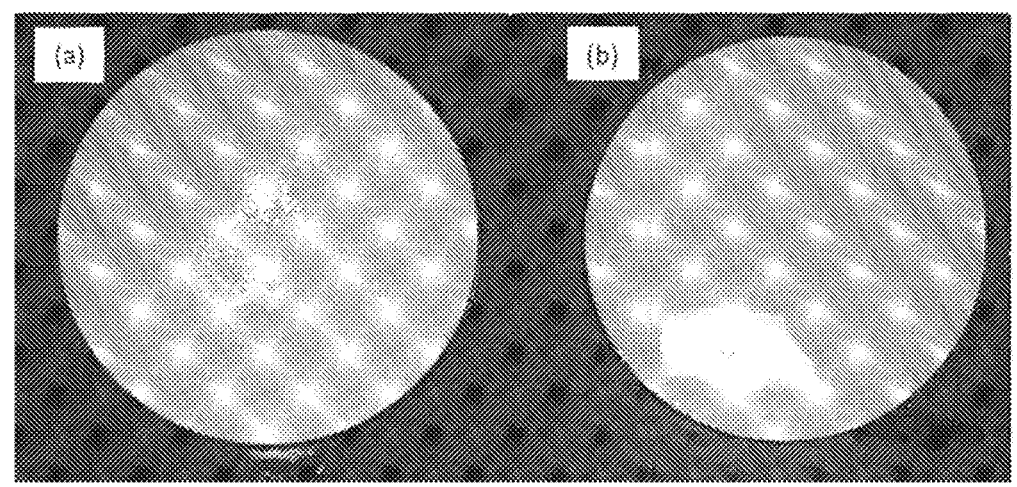
FIG. 12 illustrates an example of wet filter as a control (panel a) and filter damaged with 10 ml, 2000 ppm Alcoflood 935 (panel b).

Initial experiments were performed using nylon filters as a proxy for low permeability rock to demonstrate the potential for use of peroxide and HRP for remediation of polymer damage to the filter; here "damage" will refer to permeability losses due to the buildup of polymer on the filter and not mechanical damage. Filtration tests were conducted using 0.1 micron, nylon filters to evaluate HRP component addition order and quantify the flowrate recovery when filter paper was highly damaged with HPAM polymer. The permeability of the filter papers used was very uniform with the mean undamaged flowrate for all of the filters used at 64.1±2.1 ml/min under constant backpressure. Approximately 10 ml of 2000 ppm polymer solution was flowed to build up a model "filter cake" to create flowrate decreases of 99.86±0.02% for all filters tested. FIG. 12 shows pictures of undamaged and damaged filters. In this image, the texture of the woven filter can be seen on the wet undamaged filter (a), while the damaged filter shows a smooth, glossy gel-like layer that has developed (b). To recovery the permeability of the damaged filter, various scenarios were performed on both the method of damage formation and the recovery technique. As shown in Table 3, simply treating the polymer plugged (damaged) filter by adding hydrogen peroxide does little to nothing to remediate the filter permeability. However, when just one treatment is performed with $H_2O_2$ and the HRP enzyme (with or without NADH) in the solution above the plugged filter, the permeability improves to a modest but statistically relevant, 2.0% to 6.4%. Here, NADH was also investigated as in our previous study as it is known to reduce the very small amount of polymer degradation due to the peroxide alone; i.e. reduce any background side reactions. Interestingly, when the HRP is added to the polymer during the flow (not after as above) and resulting plugging from the polymer solution, the recovery with treatment of just peroxide (with or without NADH) improves to 13-14%. Here, the HRP becomes imbedded in the polymer film and filter as opposed to the previous scenarios where the HRP is in the solution above the filter. Thus, as the peroxide diffuses into the HPAM polymer film, the reaction is initiated in the enzyme with concentrated polymer surrounding it to immediately react and degrade. This fact contributed to development of the HRP immobilization studies below. It should be noted that these treatments are un-optimized (concentrations, duration, number of treatments, etc.) and better results are expected with further study. Although moderate recoveries were produced for these unidirectional tests, this indicates the potential of the peroxide and enzyme treatment for actual core samples (rock) (see next section).

Control experiments were conducted to observe flowrate change attributed to polymer re-dissolution, i.e. polymer from the filter cake diffusing back into solution during the treatment time. After the filters were plugged, the polymer solution was removed and replaced with water and allowed to sit for 24 hours. Permeability change due to cake dissolution was tested by measuring the filter, undamaged flowrate of water, creating the cake with 10 ml HPAM, then adding 10 ml water in place of the treatment. After 24 hours, only a negligible recovery (0.08±0.03%) in flowrate was observed. Thus, re-dissolution of the polymer film does not appear to be factor within the time period of the study. Controls were repeated with a 24-hour treatment with peroxide (no HRP), and results were nearly identical to the water treatment (0.08±0.02%); again indicating that the enzyme catalyst, HRP is necessary.

TABLE 3

Mean percent recovery achieved when cake and treatment contain different components. Filtration conducted using 0.1 μm, nylon filter paper.

| Cake formation | 24-hour treatment | Mean Recovery (%) | Std dev | n |
|---|---|---|---|---|
| HPAM | water | 0.08 | 0.03 | 3 |
| HPAM | peroxide | 0.08 | 0.02 | 3 |
| HPAM | HRP, peroxide | 2.0 | 0.8 | 3 |
| HPAM | HRP, NADH, peroxide | 6.4 | 3.9 | 4 |
| HPAM & HRP | peroxide | 13.1 | 10.3 | 4 |
| HPAM & HRP | NADH, peroxide | 14.0 | 7.4 | 4 |

10 ml of components to form "cake"; 24-hour treatments. Concentrations for HPAM, HRP, NADH, and peroxide are 2000 ppm, 45.0 μM, 1.4 mM, and 96.9 mM hydrogen peroxide respectively. Positive-pressure was 20 psig and treatment was applied for 24 hours at room temperature.

Free HRP: Core Flooding

Indiana Limestone (ILS, 1-4 md) was used to evaluate permeability recovery using HRP treatment. Indiana Limestone was chosen due to low, but experimentally manageable, permeability and is intended to simulate other types of low permeability geologic formations. Limestone fracturing is well established. In all, about 20 cores were evaluated including method development studies and originated from the same source. Little heterogeneity in dimensions or porosity was observed for the cores as a function of height of the total core (approximately 30+ cm total length). For instance, the cores (1.68±0.07 cm long and 2.54±0.01 cm diameter) had average pore volumes and porosity of 1.27±0.09 cm$^3$, and 0.149±0.008 respectively. However, initial brine permeability varied from about 1.5 to 3.7 md. Experimental sets are made of at least three core samples to evaluate the permeability change after treatments with standard deviations to represent the random error. Damage was created using 1.0 ml, 2000 ppm HPAM solution and flowrate for all steps was held at 0.2 ml/min. After damage, the temperature was increased from room temperature to 30° C. then the treatment method was introduced for 24 hours. Brine was pumped through the core for 15 hours at 0.2 ml/min at which time the recovered permeability was measured. Percent permeability damage and recovery are a function of the initial undamaged permeability ($K_i$), damaged permeability ($K_d$), and recovered permeability ($K_r$). The average percent damage created for all cores was 88.9±2.9 percent and resulted in significant pore plugging. All treatments and permeability measurements were obtained in the same direction (unidirectional) through the core as a means of testing the recovery. This method allowed for the analysis of residual resistance factor (RRF) and polymer layer thickness (β) to help quantify recovery (see below). It should be pointed out measuring recovered permeability in the inward direction is a severe test of any potential remediation method as the degraded polymer would be forced through the pores of the core sample. In an actual reservoir, the most important permeability would be of oil or gas production (formation to wellbore) and not in the direction of the hydraulic fracturing flow (wellbore to formation). However, this is beyond the scope of these studies aimed at demonstrating the proof of concept. It is therefore expected that any recovery from treatments and measurements from unidirectional flow of brine would lead to significant improvement for oil and gas production for any actual field treatment.

Table 4 illustrates the results of a variety of different treatment scenarios and control experiments. A set of control experiments were conducted whereby the damaged core was treated with brine instead of the HRP/$H_2O_2$ treatment. The results illustrate that no recovery occurs throughout the duration of treatment and 15-hour brine flush as indicated from the permeability (recovery of 0.04%±2.12%). However, when HRP and peroxide are added as a treatment, an average recovery of 9.6±2.9 percent was obtained as shown in Table 4. This illustrates that the enzyme catalyzed treatment reduces the MW and viscosity of the polymer filter cake and reduced the amount of pore plugging observed. The reduction in pore plugging is discussed below by comparing polymer layer thickness (β) before and after treatment. Again, this permeability improvement is from a conservative test of unidirectional flow for damage, treatment, and permeability measurements.

The effect of the HRP/$H_2O_2$ treatment on an undamaged, native core was investigated. As shown in Table 4, forcing some of the remaining treatment solution through the core actually leads to a reduced permeability of 24%±13 percent. While the solution is dilute in HRP, the enzyme is a biopolymer with a molecular weight of approximately 44,000 g/mol and a diameter of approximately 2.5-3.0 nm. In addition, the HRP enzyme can form dimers and trimers, especially upon degradation. Thus, it would potentially be trapped by some pore sizes in the core, depending on pore connectivity and throat diameters; in addition to being trapped in HPAM filled pores before a certain amount of degradation of the HPAM can take place.

Preliminary studies indicated that a longer sand/enzyme exposure time of 96 hours did not significantly change the amount of immobilized HRP concentration resulting in about 1.07 mg HRP per gram sand. The activity of the immobilized enzyme was determined and compared to a control of free enzyme in solution. For the control (subjected the same conditions as immobilized samples in the absence of sand), and immobilized HRP on sand. Experimental results showed that this unoptimized immobilization technique does decrease the activity versus the control of free enzyme, under the same dilution (4:1, water to enzyme solution) (Table 5).

TABLE 5

Unit Activity (U) of control versus HRP immobilized on Ottawa sand.

|  | [U/ml solution] | [U/mg HRP] |
| --- | --- | --- |
| Control | 214.2 ± 15.8 | 214.2 ± 15.8 |
| HRP-Sand | 1.1 ± 0.6 | 1.08 ± 0.6 |
|  | [U/g sand] | [U/mg HRP on Sand] |

Literature studies indicate that modified immobilization techniques can often lead to much higher retained activities upon immobilization even up to 77-78% of free enzyme. The immobilized concentration and activity in this study are similar to previously observed values for sand. Johnson and Thornton compared immobilization of lactoperoxidase on porous glass, hornblende, biotite, muscovite, feldspar, and sand using APTES and glutaraldehyde binding method in addition to a metal linking method. The results of this study showed that APTES/glutaraldehyde method resulted in the

TABLE 4

Recovery data for core flooding experiments using free enzyme. (n ≥ 3)

| Data Set | Description | Initial Permeability (md) | Damaged Permeability (md) | Percent Damage (%) | Recovered Permeability (md) | Damage Recovery (%) |
| --- | --- | --- | --- | --- | --- | --- |
| 1 | No damage: HRP/peroxide treatment | 2.79 ± 0.71 | — | — | 2.07 ± 0.35 | ** −24.1 ± 12.5 |
| 2 | Brine treatment | 3.62 ± 0.48 | 0.51 ± 0.09 | 86.0 ± 1.9 | 0.50 ± 0.01 | 0.0 ± 2.1 |
| 3 | HRP/peroxide treatment | 3.72 ± 0.94 | 0.43 ± 0.32 | 89.2 ± 5.8 | 0.79 ± 0.44 | 9.6 ± 2.9 |
| 4 | Immobilized HRP treatment | 2.49 ± 0.87 | 0.31 ± 0.18 | 87.7 ± 2.7 | 0.99 ± 0.40 | 28.0 ± 0.7 |

Indiana Limestone cores were damaged using 1 ml, 2000 ppm Alcoflood 935. Treatment solutions were applied for 24 hours at 30° C. Recovered permeability was measured after 15-hour brine flush to ensure steady state flow.
** Represents residual damage after HRP, NADH, and peroxide in the absence of HPAM.

Overall, core flooding results, using free enzyme, show that a significant recovery is possible using the full enzyme treatment but the rigorous method for testing the recovery creates residual permeability reduction by HRP. To elevate the actual permeability recovery, and eliminate negative contribution by the enzyme, HRP was covalently bound to Ottawa sand. Not only would this eliminate the enzyme damage, it would also ensure that HRP is concentrated near the polymer damage, which resulted in greater recovery for filtration experiments.

Immobilized HRP: Loading and Activity

The immobilized HRP on sand was initially characterized as to the amount of bonded enzyme. Standard HRP activity assays are employed using UV-vis absorption spectroscopy. The ultimate immobilized concentration was calculated as 1.03±0.18 mg HRP per gram sand.

highest specific activity for porous glass (2.5 U/g) and no detectable activity for sand. In the current study, 1.1 U/g specific activity was achieved for enzyme immobilization on sand using the APTES/glutaraldehyde binding method. In addition, a study using 3-aminopropyltriethoxysilane and glutaraldehyde cross linker studied the amount of trypsin binding achieved from iron and non-iron containing sand. The results of the study showed that between 1.88 and 2.31 mg/g bound protein was achieved for all samples. The concentration of trypsin immobilized on sand corresponds well with the finding in the current study but does suggest that some improvement can be made to the HRP/Ottawa sand system.

Immobilized HRP: HPAM Viscosity Reduction

Figure 13:
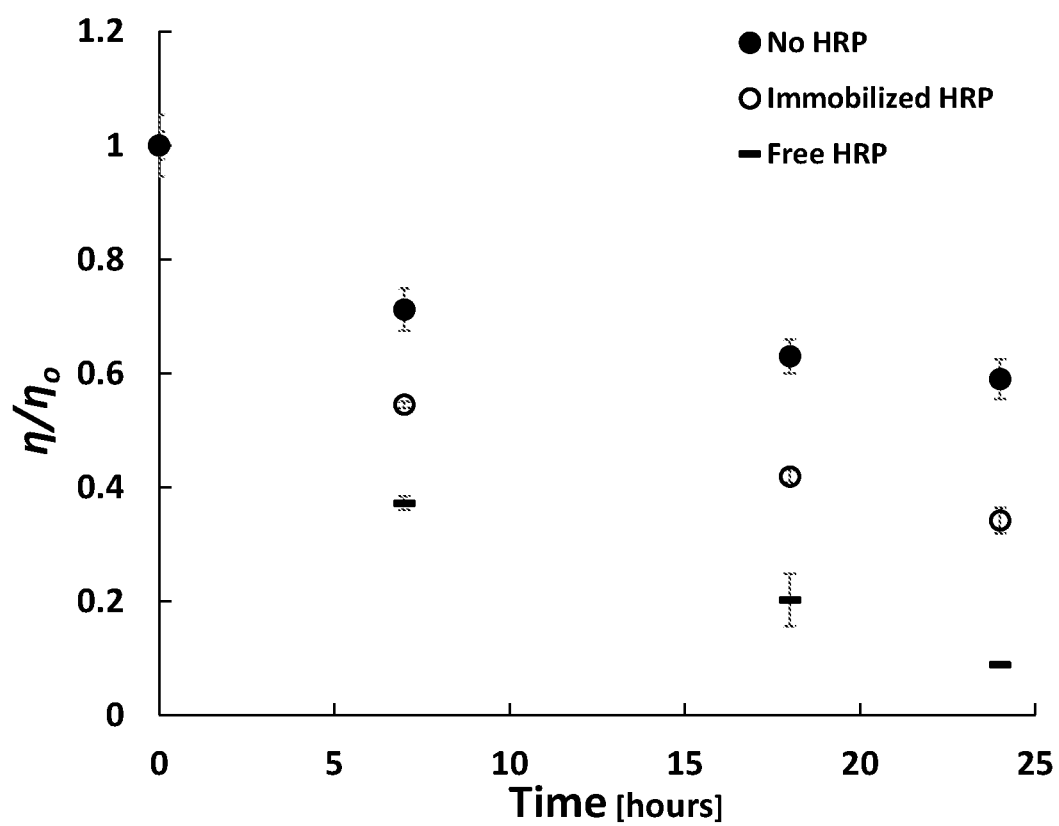
FIG. 13 is a plot illustrating the reduction in HPAM viscosity observed in the presence of HRP treated and untreated Ottawa sand. Samples were incubated at 37° C. and viscosity is measured at 75 $s^{-1}$ and 25° C. (n=3).

To confirm that the immobilized enzyme has the ability to catalyze the breakdown of HPAM, the viscosity of 1980 ppm Alcoflood 935 was observed in the presence of free and immobilized enzyme. For samples containing no HRP, untreated Ottawa sand and peroxide was present in HPAM solutions. The amount of free enzyme used was based on previous concentration studies using HRP immobilized on Ottawa sand (1.032 mg HRP/mg sand). The reduction in viscosity was measured periodically over a 24-hour period and the results are depicted in FIG. 13. The initial viscosity of solutions were 13.34±0.56 centipoise (n=6) using samples with and without free HRP. The results of this study show that there was a significant reduction in viscosity observed for both the free and immobilized enzyme in comparison to sample containing no HRP. Furthermore, a greater reduction in viscosity and rate is observed for the free enzyme when compared to the immobilized sample as expected for the higher unit activity. The results of this study confirm that there is a decreased activity observed with the immobilized enzyme sample but it is still sufficient to catalyze significant breakdown of HPAM.

As a control, sand without immobilized HRP was investigated. As shown in FIG. 13, a reduction in viscosity is observed for HPAM samples containing no HRP and just $H_2O_2$. This is in stark contrast to our previous studies where little to no degradation of HPAM occurred in solution with $H_2O_2$. A study conducted by Ravlkumar and Gurol studied the decomposition of hydrogen peroxide in the presence of sand. The study showed percent decomposition values 5-10 times higher in the presence of sand when compared to glass beads. Higher peroxide percent decomposition was observed in sands containing higher iron content up to 22% depending on the sample. Ottawa sand used in the current study contains about 99.8 SiO2, 0.02% $Fe_2O_3$, 0.06% $Al_2O_3$, with the remaining content consisting of trace minerals. Therefore, 0.5 g untreated sand would be equivalent to 0.1 mg iron oxide. Although the iron content in the Ottawa sand sample is low, this may be partially catalyzing the observed viscosity reduction for samples not containing HRP.

Immobilized HRP: Core Flooding

The immobilized enzyme was used in the core flooding studies to reevaluate the HPAM damage recovery and eliminated the chance for any plugging from the treatment procedure itself. Experimental procedure mimicked that used for core flooding studies but one gram, enzyme treated Ottawa sand was placed on top of the core after damage was created. The results using the immobilized samples show a recovery of 32.0±0.4 percent (see Table 4). These results are a 75% improvement compared to free enzyme treatment. As expected, the sand itself, with much higher porosity than the limestone, showed no measurable change in permeability. Data for free and immobilized HRP correlate well with the damage observed from the free enzyme reaction alone. During an actual field treatment, the immobilized sand would be imbedded with the polymer filter cake, upon fracture closure, and possibly provide even better degradation of the film. Therefore, this technology could be further developed as more cost effective fluid remediation technique.

Further Core Flooding Analysis

Much of the literature for analysis of permeability with HPAM solutions relate to intentionally reducing permeability for Enhanced Oil Recovery (EOR). In this process, concentrated HPAM solutions are injected into the rock matrix to reduce the permeability of highly water flooded areas in order to divert the flow to lesser flooded areas. Thus, similar analysis techniques for EOR permeability (but with opposite goals) may also be useful for these studies. In these studies, the permeability reduction quantified by means of the recovery factor (RF) and residual resistance factor (RRF) as described by Equations 10 and 11 and are measured at steady state. In addition, the average pore radius ($r_p$, μm) and the average thickness of the polymer layer (β, μm) can be calculated using Equations 12 and 13. The resistance factor is a measure of the polymers effective viscosity as it flows through porous media and was not calculated in this study because steady state polymer flow was not achieved. The residual resistance factor, RRF, is a measure of the polymer induced permeability reduction. The residual resistance factor can be calculated using undamaged ($K_i$) and damaged permeability ($K_d$) values presented in previously presented tables.

$$RF = \frac{\Delta P_{Polymer}}{\Delta P_{Brine}} \qquad 10$$

$$RRF = \frac{\Delta P_{Brine\ after\ HPAM\ injection}}{\Delta P_{Brine\ before\ HPAM\ injection}} \text{ or } \frac{K_{Brine\ before\ HPAM\ injection}}{K_{Brine\ after\ HPAM\ injection}} \qquad 11$$

$$r_p = \left(\frac{8*K_i}{\Phi}\right)^{\frac{1}{2}} \qquad 12$$

$$\beta = r_p * (1 - RRF^{-\frac{1}{4}}) \qquad 13$$

where ΔP is the pressure drop, Φ is the porosity, and $r_p$ is the average pore radius. First, using the above equations, the values for RRF, $r_p$, and polymer layer thickness were calculated based from the average porosity, undamaged, and damaged permeability (Table 6). An average of all cores was used for this calculation in order to find the overall average pore radius and polymer layer thickness. The average pore radius is used in subsequent calculations to find the change in polymer layer thickness before and after applying treatment. As shown, the average polymer film thickness (0.16±0.03 μm) for the damaged cores (88.9±2.9% damage) is close to half of the average pore radius (0.36±0.07 μm) and indicates significant flow damage.

TABLE 6

Shows average undamaged permeability ($K_i$), porosity (ϕ), residual recovery factor (RRF), pore radius, and polymer layer thickness (β) from all core flooding experiments. Values are based off all core flooding studies using Indiana Limestone damaged with 1 ml, 2000 ppm Alcoflood 935.

| $K_i$ (md) | Φ | RRF | $r_p$ (μm) | β (μm) |
|---|---|---|---|---|
| 2.43 ± 0.95 | 0.149 ± 0.008 | 9.43 ± 2.45 | 0.36 ± 0.07 | 0.16 ± 0.03 |

To quantify the magnitude of recovery, the residual resistance factor is recalculated using recovered permeability values ($K_r$) measured after treatment from individual data sets. When compared to the initial values, calculated using ($K_d$), the reduction in polymer layer thickness can be compared before and after treatment. The new residual resistance factors and corresponding polymer layer thicknesses, calculated after treatment, are designated as $RRF_a$ and $β_a$ respectively and utilized the average pore radius ($r_p$) calculated in Table 6. Since there is significant variation in recoveries, the calculations were conducted using average recovered permeability values obtained from individual data sets. Table 7 lists the calculated residual resistance factors and polymer layer thicknesses for each data set. The data shows some variation in RRF between sets but no significant difference is apparent. In addition, little difference was seen in the polymer layer thickness (before treatment) with three of the data sets resulting in a thickness of 0.16 μm. After treatment with the full enzyme system (i.e. HRP, NADH, peroxide), the polymer layer thickness was reduced by 0.04 um and the residual resistance factor was reduced by half. Little to no change was observed when the cake was subjected to 15-hour brine flush, in the absence of treatment, and with the enzyme without peroxide. Core exposure to treatment alone (no HPAM) did show to create a residual resistance factor, which resulted in an absorbed thickness of 0.03±0.02 μm.

Figure 14:
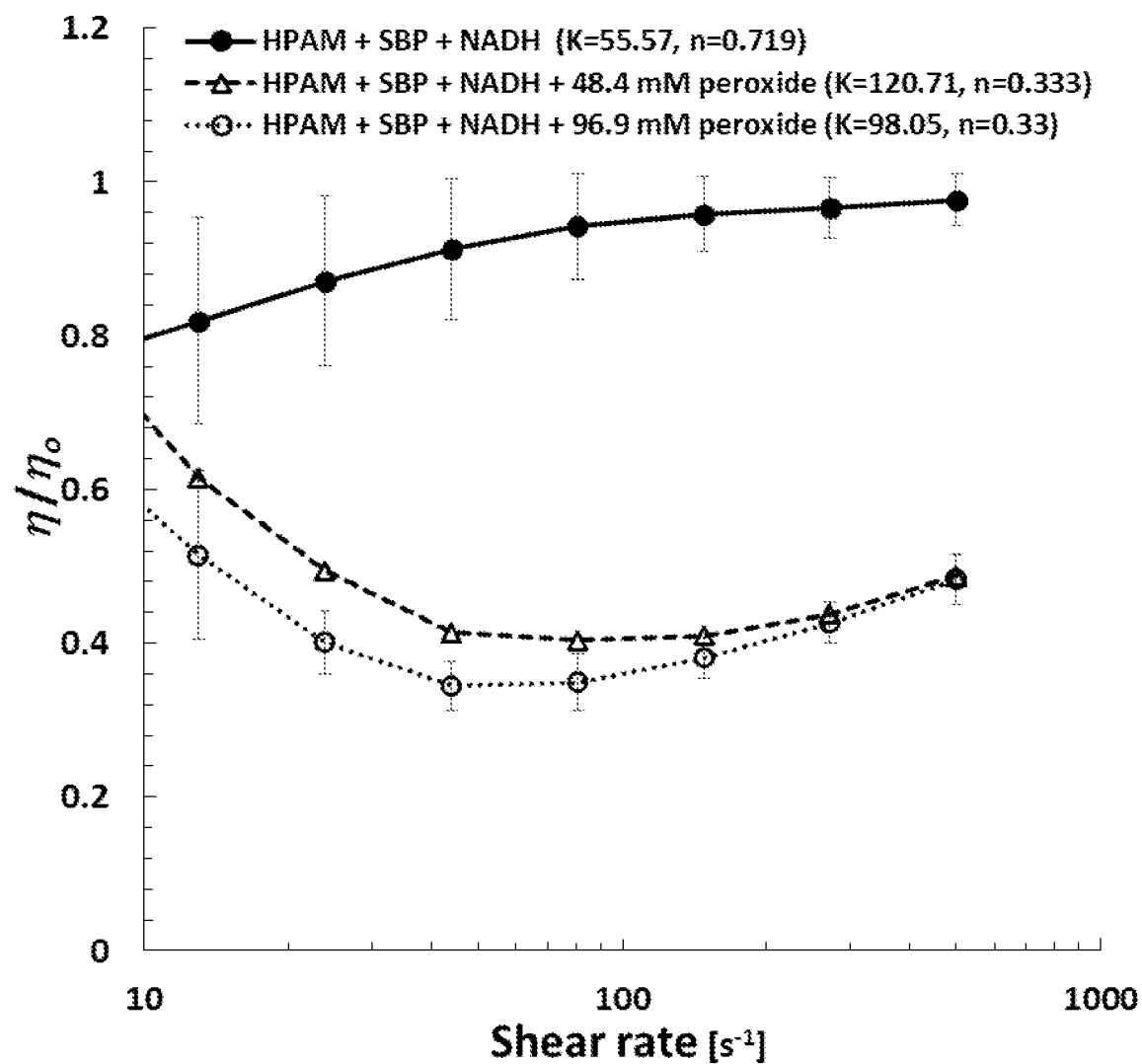
FIG. 14 is a plot illustrating the reduction in 1980 ppm Alcoflood 925 viscosity observed using 45.0 µM soybean peroxidase, 1.4 mM NADH and varying peroxide concentration. Viscosity was measured using Anton Paar rheometer at 25° C. after 24-hour incubation at 37° C.; lines are smoothed data (n=3)
Figure 15:
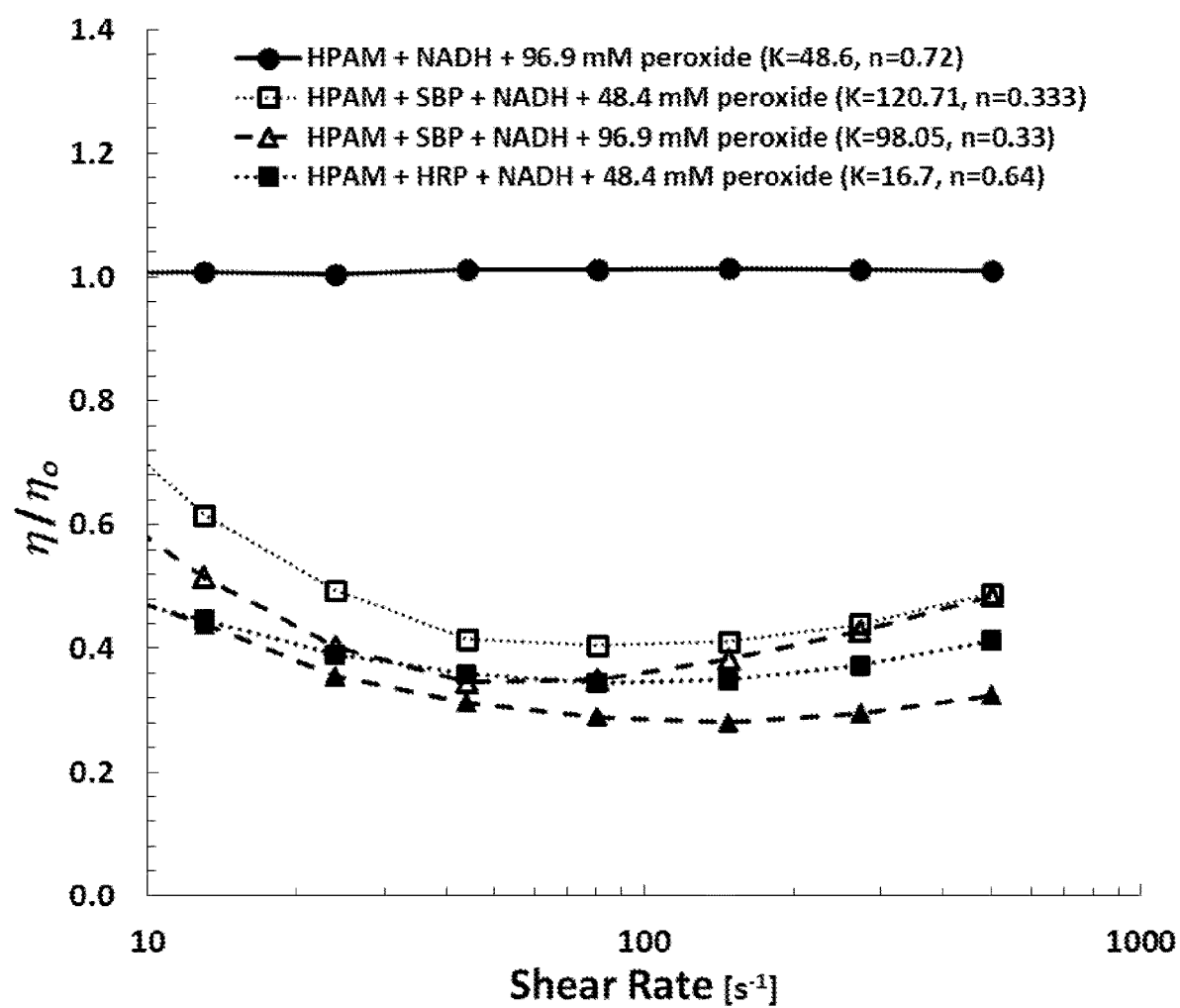
FIG. 15 is a plot of viscosity profiles comparing HRP and SBP samples for two peroxide concentrations. Lines are smoothed data, n=3 for HRP and SBP with 96.9 mM peroxide.

Data collected for SBP catalyzed degradation is shown in FIG. 14 where control and 96.9 mM peroxide concentrations represent three samples and 48.4 mM is represented by one sample. A single sample was used because SBP enzyme was limited and the additional sample was done out of curiosity. FIG. 15 shows the comparison between SBP and HRP with equivalent concentrations. The data shown in this figure is a combination of data presented in FIG. 1 and FIG. 14.

The use of soybean peroxidase, after 24-hour incubation at 37° C., has created a similar effect on HPAM solution

TABLE 7

Residual resistance factors and polymer layer thickness calculated for each data set. Abbreviations (RRF) an (β) correspond to resistance factors calculated using damaged permeability ($K_d$). Abbreviations ($RRF_a$) an ($β_a$) correspond to resistance factors calculated using recovered permeability ($K_r$).

| Data Set | Description | Un-damaged $K_i$ (md) | Damaged $K_d$ (md) | Recovered $K_r$ (md) | RRF | β (μm) | $RRF_a$ | $β_a$ (μm) |
|---|---|---|---|---|---|---|---|---|
| 1 | No damage: HRP/peroxide treatment | 2.79 ± 0.71 | — | 2.07 ± 0.35 | — | — | 1.35 ± 0.25 | 0.03 ± 0.02 |
| 2 | Damaged: Brine treatment | 3.62 ± 0.48 | 0.51 ± 0.09 | 0.50 ± 0.01 | 7.23 ± 1.08 | 0.14 ± 0.01 | 7.20 ± 0.91 | 0.14 ± 0.01 |
| 3 | Damaged HRP/peroxide treatment | 3.72 ± 0.94 | 0.43 ± 0.32 | 0.79 ± 0.44 | 11.1 ± 5.20 | 0.16 ± 0.03 | 5.22 ± 1.52 | 0.12 ± 0.02 |
| 4 | Damaged: Peroxide treatment only | 1.48 ± 0.13 | 0.16 ± 0.02 | 0.42 ± 0.06 | 9.53 ± 2.00 | 0.16 ± 0.01 | 3.51 ± 0.26 | 0.10 ± 0.01 |
| 5 | Immobilized HRP | 2.42 ± 0.87 | 0.31 ± 0.12 | 1.0 ± 0.40 | 8.41 ± 1.84 | 0.15 ± 0.01 | 2.49 ± 0.13 | 0.07 ± 0.01 |

Summary

In this Example, more sustainable enzyme-catalyzed methods for remediating polyacrylamide filter cakes using the "green" oxidant hydrogen peroxide are demonstrated. The HRP/$H_2O_2$ treatment was initially tested on synthetic flat filters plugged with HPAM. The un-optimized treatment method was able to increase the permeability. Indiana Limestone core samples with low permeability (<4 md) were damaged and then the HRP/$H_2O_2$ treatment was used to improve the flow. It was observed that the enzyme treatment method actually both increases and decreases the damage in a unidirectional flow system; which would not occur in an actual field treatment. However, immobilizing the enzyme on sand alleviated any further damage due to the enzyme plugging pores and increased the recovery of the damaged cores. This immobilized system may be a useful platform for remediation of polymer damage in hydraulic fracturing operations. Moreover, the renewable and biodegradable reactant and catalyst may be able to help remediate other target chemicals in the fracturing fluid alleviating the need for large-scale flowback water treatment.

Example 3. HPAM Viscosity Reduction using Soybean Peroxidase

Experiments were conducted with soybean peroxidase (SBP) as an alternative for HRP. As stated in the introduction, SBP is a more economical alternative because the enzyme easily extracted from soybean hulls, the hulls are a waste product of soybean processing, and the bean is abundant is in the Midwest. The following experiment uses Alcoflood 935 (HPAM) in conjunction with NADH at equivalent concentrations as used for HRP experiments.

viscosity as seen with reduction with HRP. FIG. 14 illustrates the change in viscosity relative to the initial solution viscosity at time zero ($η_0$) at each shear rate. As shown, after HPAM solutions undergo 24 hours incubation, the fractional change in viscosity decreases only at low shear rate. Unlike solutions with HRP, SBP viscosity reduction is proportional to the amount of peroxide added to the solution only at low shear rates. At high shear rates the viscosity reduction is independent of peroxide added. Although similar at high shear, increasing the concentration of peroxide results in increased degradation of HPAM as evidenced by lower viscosity after a 24-hour incubation. The reduction observed was slightly less for SBP, compared to HRP, for 48.4 and 96.9 mM peroxide solutions at 75 $s^{-1}$ resulting about 60% and 65% respectively. As with the HRP experiments, the fractional decrease does change with shear rate. The fractional change indicates larger differences at relatively large and small rates. The power law index (n) for the same solutions show increased shear thinning characteristics with increased peroxide concentration at low shear rates. Furthermore, shear-thinning characteristics are more evident with using SBP as opposed to HRP resulting in power law indices of 0.33 and 0.54 for 96.9 mM peroxide respectively.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative components, compositions, and method steps disclosed herein are specifically described, other combinations of the components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for degrading a polymer within a subterranean formation, the method comprising:
   (a) providing a subterranean formation containing a polymer there within and a wellbore in fluid communication with the subterranean formation;
   (b) injecting a first composition comprising a peroxidase enzyme dissolved or dispersed in an aqueous carrier through the wellbore into the subterranean formation; and
   (c) injecting a peroxide through the wellbore into the subterranean formation.

2. The method of claim 1, wherein the polymer is deposited on a surface within the subterranean formation.

3. The method of claim 2, wherein the polymer deposited on the surface comprises a filter cake formed from a drilling fluid, a drill-in fluid, or a fracturing fluid.

4. The method of claim 1, wherein the polymer comprises a carbon-carbon backbone.

5. The method of claim 1, wherein the polymer comprises a biopolymer.

6. The method of claim 5, wherein the biopolymer comprises a polysaccharide.

7. The method of claim 1, wherein the polymer comprises a polyacrylamide.

8. The method of claim 7, wherein the polyacrylamide comprises a polyacrylamide homopolymer or copolymer derived from acrylamide, N-substituted hydrosoluble derivatives of acrylamide, hydrosoluble N-vinylamides, or combinations thereof.

9. The method of claim 1, wherein the peroxidase enzyme is dissolved in the aqueous carrier.

10. The method of claim 1, wherein the peroxidase enzyme is encapsulated within a carrier particle.

11. The method of claim 1, wherein the first composition further comprises proppant particles.

12. The method of claim 11, wherein the peroxidase enzyme is immobilized on the proppant particles.

13. The method of claim 12, wherein the peroxidase enzyme is covalently bound to the surface of the proppant particles.

14. The method of claim 11, wherein the proppant particles are chosen from silica sand, resin-coated silica sand, ceramic, or combinations thereof.

15. The method of claim 1, wherein the first composition is injected during a hydraulic fracturing operation.

16. The method of claim 1, wherein the first composition is injected during a slickwater fracturing operation.

17. The method of claim 1, wherein step (b) and step (c) are performed simultaneously.

18. The method of claim 17, wherein the peroxide is present in the first composition.

19. A method for degrading a polymer within a subterranean formation, the method comprising:
   (a) providing a subterranean formation containing a polymer there within and a wellbore in fluid communication with the subterranean formation; and
   (b) injecting an enzyme breaker composition through the wellbore into the subterranean formation to degrade the polymer, wherein the enzyme breaker composition comprises proppant particles dispersed in an aqueous carrier, and a polymer-degrading enzyme covalently immobilized on the proppant particles.

20. The method of claim 19, wherein the polymer-degrading enzyme comprises a peroxidase, and the method further comprises injecting a peroxide into the subterranean formation.

21. The method of claim 1, wherein the peroxidase enzyme and the peroxide are injected in an effective amount to reduce the viscosity of the polymer within the subterranean formation.

* * * * *